(12) United States Patent
Djan-Sampson et al.

(10) Patent No.: US 10,126,723 B2
(45) Date of Patent: Nov. 13, 2018

(54) PERFORMING PASSIVE MAINTENANCE ON AN ENERGY STORAGE FARM

(71) Applicant: General Electric Company, Schenectady, NY (US)

(72) Inventors: Patrick Osae Djan-Sampson, Niskayuna, NY (US); Richard Hayes Cutright, Corinth, NY (US); Robert August Kaucic, Niskayuna, NY (US); Joshua Paul Webb, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 444 days.

(21) Appl. No.: 14/609,549

(22) Filed: Jan. 30, 2015

(65) Prior Publication Data
US 2016/0226287 A1 Aug. 4, 2016

(51) Int. Cl.
*G05B 19/04* (2006.01)
*H02J 3/32* (2006.01)

(52) U.S. Cl.
CPC .............. *G05B 19/041* (2013.01); *H02J 3/32* (2013.01)

(58) Field of Classification Search
CPC ........ G05B 19/041; G05B 2219/24001; G05B 2219/24136; H02J 3/32
See application file for complete search history.

(56) References Cited

U.S. PATENT DOCUMENTS

| | | | | |
|---|---|---|---|---|
| 9,026,296 | B1* | 5/2015 | Johri | B60W 20/10 701/22 |
| 2004/0049715 | A1* | 3/2004 | Jaw | H04L 41/0681 714/43 |
| 2004/0124990 | A1* | 7/2004 | Zur | G01R 31/3644 340/636.1 |
| 2009/0230923 | A1* | 9/2009 | Hoffman | H02J 7/0063 320/136 |
| 2010/0198537 | A1* | 8/2010 | Takemori | G01R 31/3624 702/63 |
| 2010/0312744 | A1* | 12/2010 | Prokhorov | G01R 31/3679 706/52 |
| 2012/0169291 | A1 | 7/2012 | Abe et al. | |
| 2012/0217933 | A1* | 8/2012 | Abe | H01M 10/3909 320/128 |
| 2012/0223670 | A1* | 9/2012 | Kinjo | H02J 3/32 320/103 |

(Continued)

*Primary Examiner* — Robert E Fennema
*Assistant Examiner* — Santosh R Poudel
(74) *Attorney, Agent, or Firm* — Dority & Manning, P.A.

(57) ABSTRACT

In one aspect, a method of performing a passive maintenance operation on an energy storage farm may generally include receiving data associated with a maintenance schedule for each energy storage system in the plurality of energy storage systems, identifying at least one energy storage system as a charge contributor based at least in part on the data associated with the maintenance schedule, identifying at least one energy storage system as a discharge contributor based at least in part on the data associated with the maintenance schedule, and controlling the operation of the energy storage farm such that power distribution in the energy storage farm is biased so as to increase the state of charge of the charge contributor(s) prior to increasing the state of charge of the discharge contributor(s).

12 Claims, 10 Drawing Sheets

(56) References Cited

U.S. PATENT DOCUMENTS

| | | | |
|---|---|---|---|
| 2013/0038289 A1* | 2/2013 | Tse | H02M 3/158 |
| | | | 320/118 |
| 2013/0300425 A1* | 11/2013 | Shiraishi | G01R 31/362 |
| | | | 324/426 |
| 2014/0152262 A1* | 6/2014 | Nomoto | H01M 10/441 |
| | | | 320/118 |
| 2014/0197686 A1* | 7/2014 | Hiramura | H02J 7/0013 |
| | | | 307/29 |
| 2014/0336964 A1* | 11/2014 | Okumura | G01R 31/3606 |
| | | | 702/63 |
| 2014/0368033 A1* | 12/2014 | Manikandan | H02J 7/0047 |
| | | | 307/23 |
| 2016/0329716 A1* | 11/2016 | Inoue | H02J 3/383 |

\* cited by examiner

PERFORMING PASSIVE MAINTENANCE ON AN ENERGY STORAGE FARM

FIELD OF THE INVENTION

The present subject matter relates generally to energy storage farms and, more particularly, to systems and methods for distributing power within an energy storage farm when performing a passive maintenance operation on the farm.

BACKGROUND OF THE INVENTION

Battery energy storage systems (BESSs) containing one or more batteries are used in many applications. For instance, such systems are used in telecom applications, power generation applications, electric grid applications, and/or energy management applications. As a BESS is used for a given application and the batteries therein age, the batteries may need to be balanced with respect to their states of charge. The state of charge (SOC) of a battery, as used herein, is generally defined as the percentage of the full capacity of a battery that is still available for further discharge. Thus, the SOC of a battery may be used to regulate charging and discharging of the battery.

Conventionally, systems for charging energy storage systems are configured to implement an active maintenance operation in order to perform required maintenance activities on each energy storage system (e.g., resetting of the state-of-charge (SOC) of each energy storage system). This active maintenance operation is typically performed at a given frequency based on a timing device or countdown timer associated with each energy storage system. For example, in response to the expiration of the countdown timer associated with a given energy storage system, the system is taken offline to reset its SOC to a top-of-charge (TOC) state (e.g. a 100% SOC) and/or to conduct an open circuit voltage check on the system. As a result, during the performance of an active maintenance operation, the energy storage system is unavailable for power delivery, which is undesirable.

In view of the aforementioned issues, an improved system and method for performing maintenance on an energy storage farm would be welcomed in the technology.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method of distributing power among a plurality of energy storage systems in an energy storage farm, wherein each energy storage farm includes at least one energy storage device. The method may generally include receiving data associated with a maintenance schedule for each energy storage system of the plurality of energy storage systems, wherein the maintenance schedule is associated at least in part with a maintenance operation for increasing a state of charge of each energy storage system to a top-of-charge state. The method may also include identifying at least one energy storage system as a charge contributor based at least in part on the data associated with the maintenance schedule, identifying at least one energy storage system as a discharge contributor based at least in part on the data associated with the maintenance schedule and controlling the operation of the energy storage farm such that power distribution in the energy storage farm is biased so as to increase the state of charge of the charge contributor(s) prior to increasing the state of charge of the discharge contributor(s).

Another example aspect of the present disclosure is directed to an energy storage farm. The energy storage farm may generally include a plurality of energy storage systems, wherein each energy storage system includes at least one energy storage device. In addition, the energy storage farm may include a control system configured to perform one or more operations. The operations may include receiving data associated with a maintenance schedule for each energy storage system of the plurality of energy storage systems, wherein the maintenance schedule is associated at least in part with a maintenance operation for increasing a state of charge of each energy storage system to a top-of-charge state. The operations may also include identifying at least one energy storage system as a charge contributor based at least in part on the data associated with the maintenance schedule, identifying at least one energy storage system as a discharge contributor based at least in part on the data associated with the maintenance schedule and controlling the operation of the energy storage farm such that power distribution in the energy storage farm is biased so as to increase the state of charge of the charge contributor prior to increasing the state of charge of the discharge contributor.

Another example of the present disclosure is directed to a method of distributing power among a plurality of energy storage systems in an energy storage farm, wherein each energy storage system includes at least one energy storage device. The method may generally include identifying at least one energy storage system as a charge contributor and at least one energy storage system as a discharge contributor based at least in part on data indicative of a maintenance schedule, wherein the maintenance schedule is associated at least in part with a maintenance operation for increasing a state of charge of each energy storage system to a top-of-charge state. In addition, the method may include receiving a power distribution input associated with an amount of power to be delivered from or received by the energy storage farm and, responsive to the power request, determining an initial power value for each energy storage system in the energy storage farm based at least in part on a state of charge associated with the energy storage system. The method may also include determining an unallocated power value based at least in part on the received power distribution input and the initial power values determined for each energy storage system and determining an updated power value for each energy storage system based at least in part on the unallocated power value, wherein the updated power value for at least one energy storage system in the energy storage farm corresponds to an increase in the initial power value determined for the at least one energy storage system. Moreover, the method may include controlling the operation of the energy storage farm such that each energy storage system delivers or receives an amount of power equal to the updated power value determined for the energy storage system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
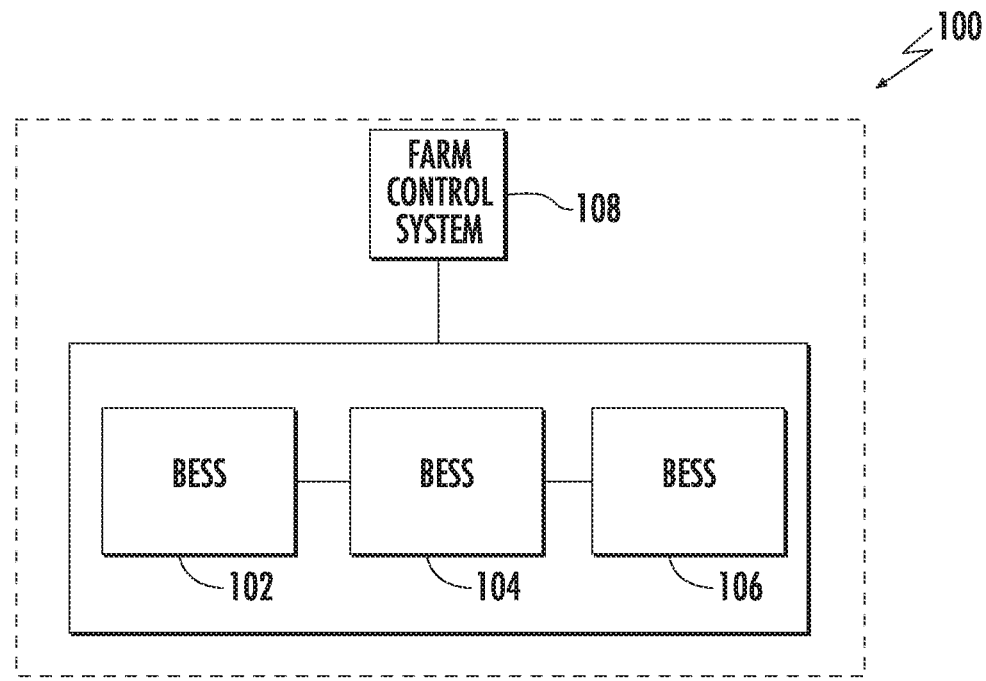
FIG. 1 depicts an example energy storage farm according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are generally directed to systems and methods for distributing power across one or more energy storage systems of an energy storage farm. An energy storage farm may include a plurality of energy storage systems, such as a plurality of battery energy storage systems (BESSs). Each BESS may contain one or more energy storage devices (e.g. batteries) coupled in series or parallel. As will be described below, power distribution within an energy storage farm may, for example, be regulated or controlled based on the performance of a passive maintenance operation and/or based on a two-stage power distribution process.

Specifically, in several embodiments, the present disclosure is directed to systems and methods for performing a passive maintenance operation(s) on the energy storage systems contained within an energy storage farm. As described above, during the performance of an active maintenance operation on an energy storage farm, an energy storage system(s) in the energy storage farm is taken offline and is unavailable for power delivery, which is undesirable. To address such issues associated with the performance of active maintenance operations, a system and method for performing a passive maintenance operation is described herein that allows for a SOC reset to be performed on an energy storage system while the system is still online, thereby maintaining the energy storage system available for power delivery. For instance, as will be described below, the disclosed system and method may allow for each energy storage system to be driven to a TOC state before the expiration of its associated countdown timer (e.g., before the time at which the active maintenance operation would typically be performed). As a result, implementation of the passive maintenance operation may allow for power to be distributed within an energy storage farm in a manner that permits energy storage systems with countdown timers that are close to expiration to be given a higher priority for charging than energy storage systems with countdown timers that are further from expiration.

In several embodiments, to implement the passive maintenance scheme, a control system(s) (e.g., a controller or other suitable computing device) associated with the energy storage farm may be configured to monitor the countdown timers for the various energy storage systems within the farm and compare the time remaining on each timer to a predetermined maintenance threshold. In such embodiments, if the time remaining on the countdown timer associated with a given energy storage system is below the maintenance threshold, the energy storage system may be identified as a charge contributor and, thus, may be given a higher priority for being charged when power is available for charging. However, if the time remaining on the countdown timer associated with a given energy storage system is above the maintenance threshold, the energy storage systems may be identified as a discharge contributor and, thus, may be given a higher priority for discharging power when a power request is received.

Additionally, in one embodiment, the control system(s) associated with the energy storage farm may be configured to take into account a charge contributor threshold when identifying each energy storage system as a charge or discharge contributor. For example, a charge contributor threshold may be provided for the energy storage farm that defines the maximum number of energy storage systems that can be simultaneously identified as charge contributors. In such an embodiment, for a new energy storage system to be switched from a discharge contributor to a charge contributor, the controller(s) may be configured to compare the current number of energy storage systems identified as charge contributors to the predetermined threshold. If the current number of charge contributors is less than the predetermined threshold, the new energy storage system may be identified as a charge contributor. However, if the current number of charge contributors is equal to or greater than the predetermined threshold, the new energy storage system may be maintained as a discharge contributor until the number of charge contributors is reduced.

By identifying each energy storage system as either a charge contributor or a discharge contributor, the operation of the various energy storage systems contained within the energy storage farm may be controlled in a manner that provides for implementation of the disclosed passive maintenance scheme. Specifically, in several embodiments, the operation of the energy storage systems may be controlled such that power distribution within the energy storage farm is biased so as to increase the SOC of the charge contributor(s) prior to increasing the SOC of any of the discharge contributor(s). For instance, in one embodiment, a discharge contribution of the charge contributor(s) may be turned off such that the charge contributor(s) are only available for charging events during power distribution whereas a charge contribution of the discharge contributor(s) may be turned off such that the discharge contributor(s) are only available for discharge events during power distribution. As such, each charge contributor(s) may be driven to a TOC state prior to the expiration of its associated countdown timer, thereby eliminating the need to take an energy storage system offline in order to perform an active maintenance operation thereon.

In addition, example aspects of the present disclosure are further directed to systems and methods for distributing power within an energy storage farm in response to a power distribution input associated with either a power request corresponding to a demand for power or a charging input corresponding to an amount of power to be received for charging. Specifically, in several embodiments, upon receipt of a power distribution input, power values for each energy storage system within the energy storage farm may be assigned utilizing a two-stage process. For example, in response to a power request, power output values may be assigned to each energy storage system, and in response to a charging input, power input values may be assigned to each energy storage system. As will be described below, the disclosed two-stage power distribution process may generally allow for the amount of power associated with the power distribution input to be distributed across the energy storage systems (e.g., as a power output or a power input) while taking into account specific power-related parameters for each energy storage system (e.g., the SOC and/or power capability of each energy storage system).

For example, during a discharge event, in the first stage of power distribution, initial power output values may be assigned to the various energy storage systems within the energy storage farm based at least in part on their respective SOCs such that energy storage systems with higher SOCs receive higher initial power output values than energy storage systems with lower SOCs. Each initial power output value may generally correspond to the initial amount of power allocated to a particular energy storage system for discharge in response to a received power request. As will be described in greater detail below, the initial power output value provided to a given energy storage system may be selected such that the assigned value does not exceed the power capability of the system. The power capability of an energy storage system may generally correspond to the total amount of power that is available for charge or discharge from the energy storage system. As a result, after assigning initial power output values according to the SOCs of the energy storage systems, a given amount of power may remain unallocated that corresponds to the difference between the power request and the sum of the initial power output values assigned to the energy storage systems. This unallocated power value may then be redistributed in the next stage of the distribution process to ensure that the final power output of the energy storage farm matches the power demand associated with the received power request.

In the second stage of power distribution for a discharging event, the initial power output values assigned to the energy storage systems may be modified or adjusted based on the power capabilities of the energy storage systems so as to take into account the unallocated power value remaining after the first stage of the process. Specifically, an amount of power equal to the unallocated power value can be redistributed to the energy storage system(s) that has not already reached its power capability. In doing so, updated power values may be determined for the energy storage systems based at least in part on the unallocated power value and the remaining power capability of each system. Thereafter, the operation of each energy storage system can be controlled so that it discharges an amount of power equal to the updated power output value determined for such system.

It should be appreciated that a similar application of the two-stage distribution process may also be utilized during a charging event associated with an amount of power to be received by the energy storage farm for charging the various energy storage systems. For example, as will be described in greater detail below, during the first stage of power distribution, initial power input values may be assigned to the various energy storage systems within the energy storage farm based at least in part on their respective SOCs such that energy storage systems with lower SOCs receive higher initial power input values than energy storage systems with higher SOCs. An unallocated amount of power may then be redistributed in the next stage of the distribution process to ensure that the final power input of the energy storage farm matches the amount of power corresponding to the charging input.

It should also be appreciated by those skilled in the art that, in several embodiments, the passive maintenance scheme and the two-stage power distribution process described herein may be implemented separate and apart from one another. However, in alternative embodiments, the two-stage power distribution process may be combined with the passive maintenance scheme to provide for a power distribution arrangement that takes into account the need for resetting the SOC of each energy storage system. For instance, in the first stage of the power distribution process for a given discharge event, the initial power output values assigned to the energy storage systems may be biased such that power is allocated to be discharged solely by the energy storage systems that have been identified as discharge contributors (e.g., by assigning each energy storage system that has been identified as a charge contributor an initial power output value equal to zero). Similarly, in the first stage of the power distribution process for a given charge event, the initial power input values assigned to the energy storage systems may be biased such that power is allocated to be received solely by the energy storage systems that have been identified as charge contributors (e.g., by assigning each energy storage system that has been identified as a discharge contributor an initial power input value equal to zero).

Referring now to the drawings, FIG. 1 depicts an example energy storage farm 100 according to example embodiments of the present disclosure. As shown, the energy storage farm 100 may include one or more energy storage systems 102-106 (e.g., one or more BESS units) coupled in series. Although FIG. 1 depicts an energy storage farm 100 having three BESS units coupled in series, it will be appreciated by those skilled in the art that various other suitable types and amounts of energy storage systems may be used and that the energy storage systems may be coupled in any suitable manner. Energy storage farm 100 further includes a farm control system 108. Farm control system 108 may generally be used to control and/or monitor the operation of the energy storage farm 100, such as by monitoring and/or controlling the power discharged from and/or received by each individual energy storage system 102-106. As will be described below with reference to FIG. 3, the farm control system 108 may, in several embodiments, correspond to or include any suitable computing device(s) and/or other processor-based device.

Figure 2:
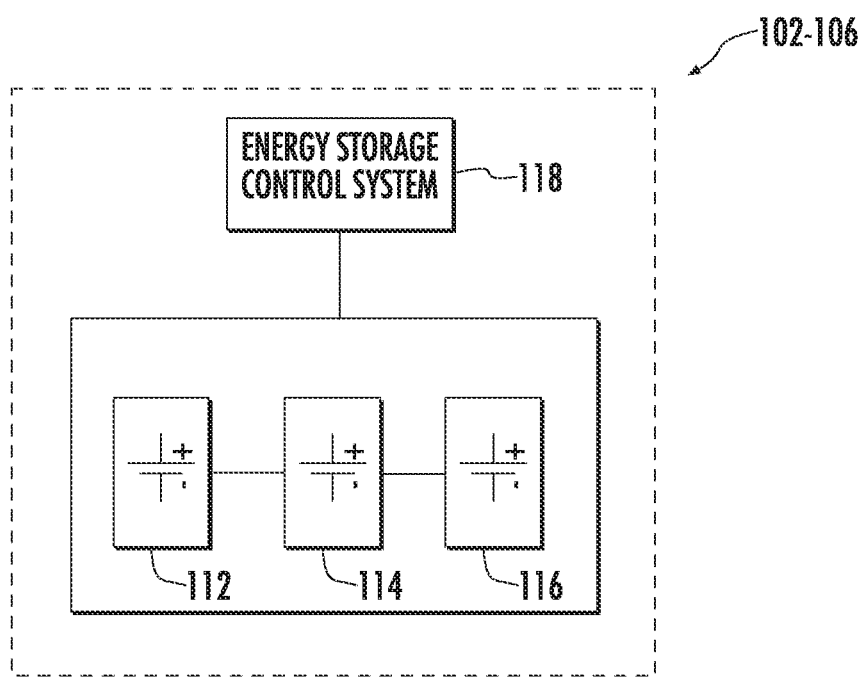
FIG. 2 depicts an example energy storage system according to example embodiments of the present disclosure.

FIG. 2 depicts an example energy storage system (e.g., a BESS unit) that may be utilized as any one of the energy storage systems 102-106 shown within the energy storage farm 100 of FIG. 1 according to example embodiments of the present disclosure. As shown, each energy storage system 102-106 may include one or more energy storage devices 112-116 coupled in series In example embodiments, the energy storage devices 112-116 may include at least one of a lithium ion battery, a sodium nickel chloride battery, a sodium sulfur battery, a nickel metal hydride battery, a nickel cadmium battery, a fuel cell, or similar. Although FIG. 2 depicts an energy storage system 102-106 with three energy storage devices coupled in series, it will be appreciated by those skilled in the art that various other suitable amounts of energy storage devices may be used and that the energy storage devices may be coupled in series or parallel. In addition, each energy storage system 102-106 may further include an energy storage control system 118 configured to monitor and/or control the operation of each individual energy storage device 112-116. As will be described below with reference to FIG. 3, the energy storage control system 118 may, in several embodiments, correspond to or include any suitable computing device(s) and/or other processor-based device.

Figure 3:
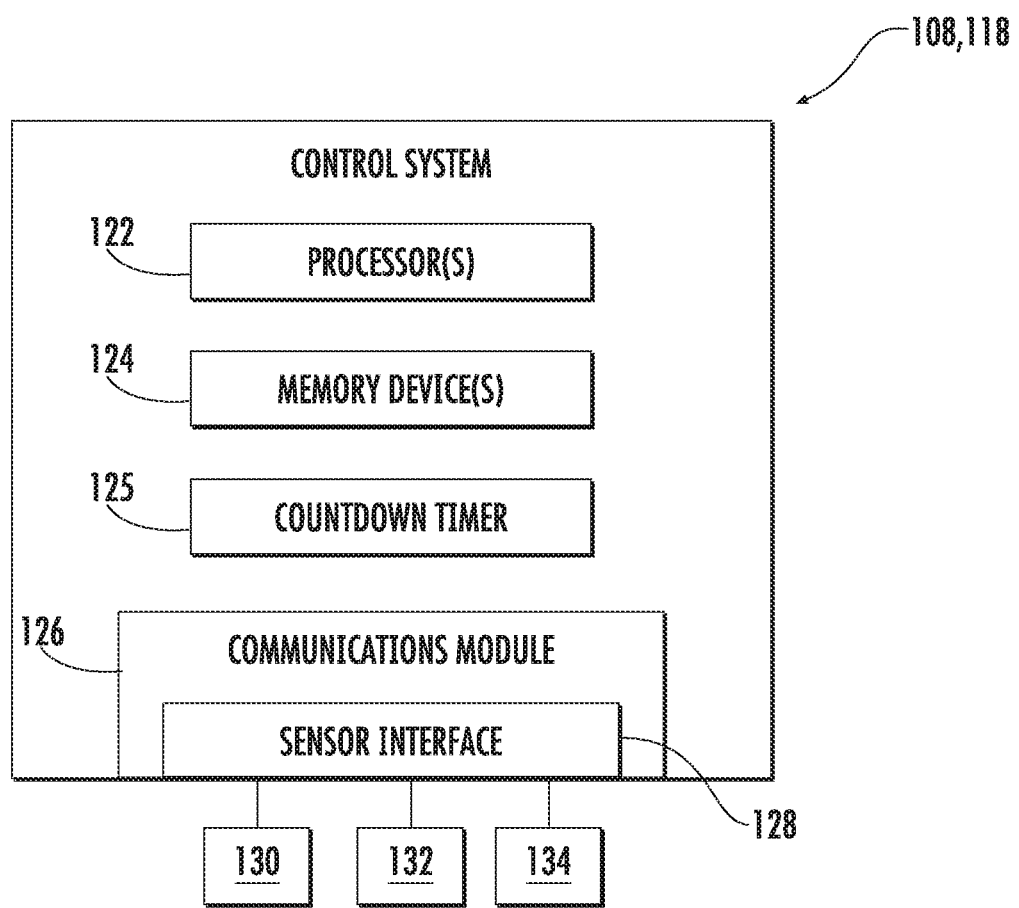
FIG. 3 depicts an example control system according to example embodiments of the present disclosure.

Referring now to FIG. 3, a schematic view of suitable components that may form part of and/or that may be included within the farm control system 108 and/or the energy storage control system 118 is illustrated in accordance with example aspects of the present disclosure. As shown, the control system(s) 108, 118 may include one or more processor(s) 122 and associated memory device(s) 124, which can be configured to perform various computer-implemented functions (e.g., by performing the methods, algorithms and/or calculations described herein and/or by storing the relevant data described herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 124 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 124 may generally be configured to store suitable computer-readable instructions that, when implemented by the processor(s) 122, configure the control system(s) 108, 118 to perform various functions including, but not limited to, implementing the control algorithm(s) and/or method(s) disclosed herein with reference to FIGS. 4, 5 and 7. For instance, computer-readable instructions may be stored within the memory device(s) 124 that, when implemented by the processor(s) 122, configure to the control system(s) 108, 118 to monitor and/or control the operation of the energy storage farm 100 and/or each energy storage system 102-106, such as by monitoring the states of charge (SOCs) associated with each energy storage system 102-106. Similarly, other functions implemented by the control system(s) 108, 118 may include, but are not limited to, calculating and reporting data, controlling the battery environment, and/or performing any other suitable control actions associated with the energy storage farm 100 and/or each energy storage system 102-106.

Additionally, the control system(s) 108, 118 may further include a communications module 126 to facilitate communications between the control system(s) 108, 118 and the various components of the energy storage farm 100. In several embodiments, the communications module 126 may include a sensor interface 128 (e.g., one or more analog-to-digital converters) to permit signals transmitted from sensors 130, 132, 134 to be converted into signals that can be understood and processed by processor(s) 122. The sensors 130, 132, 134 may, for example, be used to detect various battery-related operating conditions or parameters, such as a voltage associated with each energy storage system 102-106, a SOC of each energy storage system 102-106, a temperature of each energy storage system 102-106 and/or the like. It should be appreciated that the sensors 130, 132, 134 may be communicatively coupled to the communications module 126 using any suitable means. For example, as shown, the sensors 130, 132, 134 are coupled to the sensor interface 128 via a wired connection. However, in other embodiments, the sensors 130, 132, 134 may be coupled to the sensor interface 128 via a wireless connection, such as by using any suitable wireless communications protocol known in the art.

Moreover, as shown in FIG. 3, the control system(s) 108, 118 may, in several embodiments, be configured to implement and/or may include a countdown timer 125 associated with each energy storage system 102-106. In general, the countdown timer 125 may be utilized as a means for determining when to perform a maintenance operation(s) on a given energy storage system 102-106. For example, the control system(s) 108, 118 may be configured to re-set the countdown timer 125 to its maximum value in response to an energy storage system 102-106 being charged up to its TOC state. In such an embodiment, the countdown timer 125 may be utilized to determine when it is necessary to re-set the SOC of the associated energy storage system 102-106. For instance, as indicated above, expiration of the countdown timer 125 may signify the need to perform an offline, active maintenance operation on the energy storage system 102-106.

Figure 4:
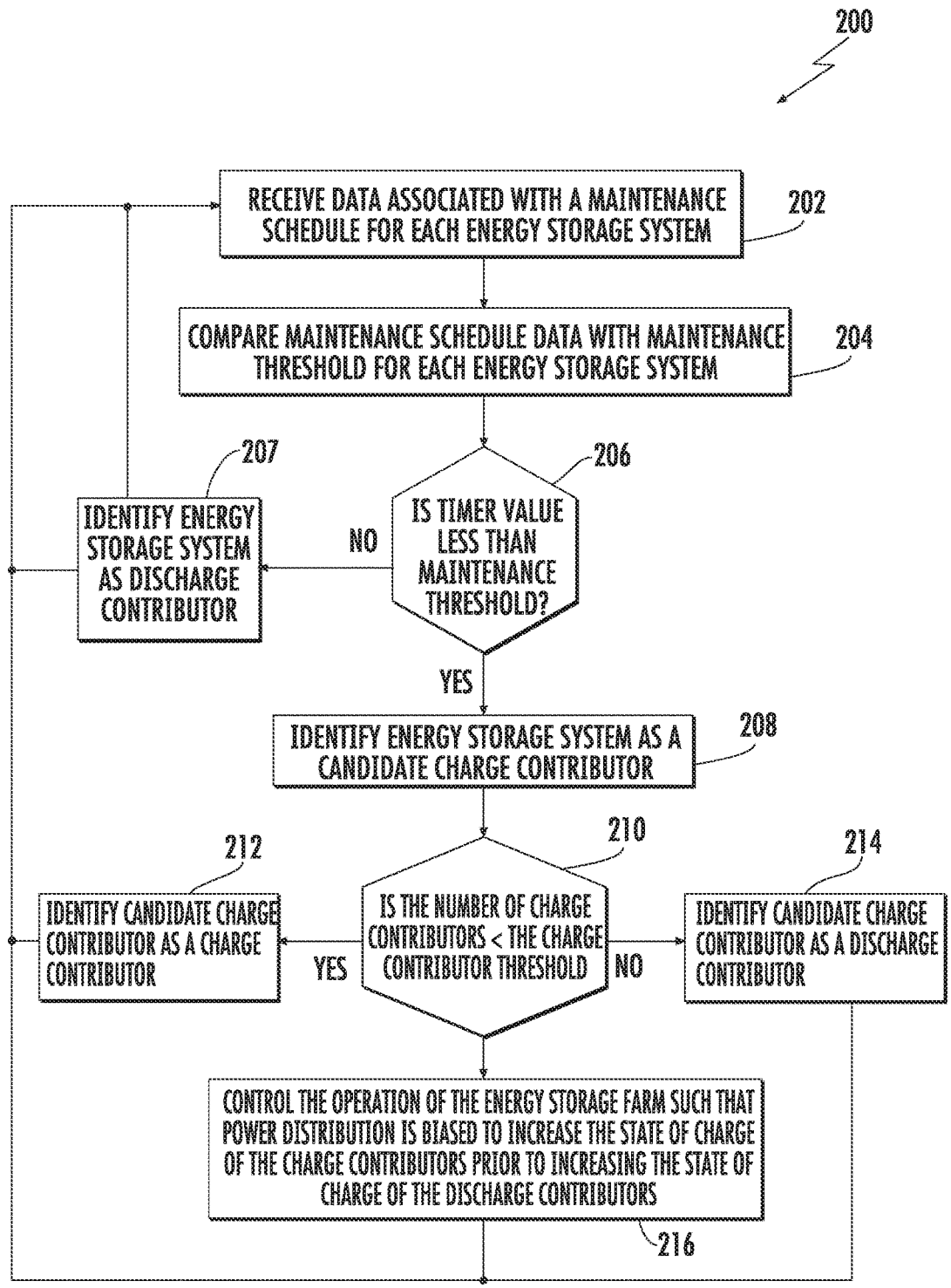
FIG. 4 depicts a flow diagram of an example method for distributing power in an energy storage farm according to example embodiments of the present disclosure, particularly illustrating one embodiment of a power distribution methodology to be utilized when performing a passive maintenance operation on the energy storage farm.

FIG. 4 depicts a flow diagram of an example method 200 for performing a passive maintenance operation on an energy storage farm according to example embodiments of the present disclosure. As described above, the disclosed passive maintenance scheme may include driving the SOC of a given energy storage system to a top-of-charge (TOC)

state (e.g., a SOC of 100%) based at least in part on the time remaining on its associated countdown timer. For instance, implementation of a passive maintenance operation may allow for power to be distributed within an energy storage farm in a manner that permits energy storage systems with countdown timers that are close to expiration to be given a higher priority for charging than energy storage systems with countdown timers that are further from expiration. As a result, the need to take an energy storage system offline in order to perform an active maintenance operation may be eliminated.

In general, the method 200 will be described herein with reference to the energy storage farm 100 shown in FIG. 1. However, it should be appreciated that the disclosed method 200 may generally be implemented within any suitable energy storage farm to allow for the performance of passive maintenance operations. Additionally, it should be appreciated that FIG. 4 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

As shown in FIG. 4, at (202), the method 200 may include receiving data associated with a maintenance schedule for each energy storage system within an energy storage farm. For instance, in several embodiments, the data may correspond to information associated with the amount of time remaining on the countdown timer 125 associated with each energy storage system 102-106. Specifically, as indicated above, the countdown timers 125 may be utilized to schedule maintenance operations associated with re-setting the SOC of each energy storage system 102-106 by driving the system to its TOC state. In such an embodiment, the countdown timer 125 for a given energy storage system 102-106 may be set, for instance, by the control system(s) 108, 118 to its maximum value when the unit reaches its TOC state, and may thereafter decrease with time from the maximum value to a minimum value (e.g., zero). As a result, the current value of each countdown timer 125 may be indicative of the amount of time remaining until it is necessary to perform a maintenance operation on the associated energy storage system 102-106. For instance, as described above, the expiration of a given countdown timer 125 may signify the need to perform an active maintenance operation on the associated energy storage system 102-106.

At (204), the method 200 may include comparing the maintenance schedule data received for each energy storage system 102-106 with a predetermined maintenance threshold. In several embodiments, the maintenance threshold may correspond to a specific countdown timer value at which, when the countdown timer 125 for any energy storage system 102-106 reaches such value, it is desired to initiate a passive maintenance operation within the associated energy storage farm 100. As such, the maintenance threshold may, for example, correspond to a countdown timer value that is greater than the countdown timer value at which it becomes necessary to perform an active maintenance operation on a given energy storage system 102-106. For example, when the maintenance schedule for an energy storage system 102-106 indicates that an active maintenance operation is to be performed when the countdown timer is decreased from its initial maximum value to a minimum value (e.g., zero), the maintenance threshold may be set as a countdown timer value that is greater than the predefined minimum value, such as a countdown timer value ranging from about 1% to about 40% of the maximum value for the countdown timer or from about 5% to about 30% of the maximum value or from about 10% to about 20% of the maximum value and/or any other subranges therebetween. Thus, by monitoring the current value of each countdown timer 125 relative to the predetermined maintenance threshold, it can be ensured that a passive maintenance operation is initiated within the energy storage farm prior to any active maintenance operations becoming necessary.

At (206), the method 200 may include determining whether the countdown timer value for any energy storage system within the energy storage farm is less than the predetermined maintenance threshold. As indicated above, based on the countdown timer values, each energy storage system 102-106 may be identified as either a discharge contributor or a charge contributor. Specifically, as shown in FIG. 4, if the current value of the countdown timer associated with a given energy storage system 102-106 is equal to or greater than the maintenance threshold, the method 200 may, at (207), include identifying such energy storage system as a discharge contributor. However, if the current value of the countdown timer is less than the maintenance threshold, the method 200 may, at (208), include identifying the corresponding energy storage system 102-106 as a candidate charge contributor. As will be described below, a candidate charge contributor may be subsequently identified as a discharge contributor or a charge contributor depending on the number of pre-existing charge contributors present within the energy storage farm.

At (210), the method 200 may include determining whether the number of energy storage systems already identified as charge contributors is less than a charge contributor threshold. In several embodiments, the charge contributor threshold may be indicative of the maximum number of energy storage systems 102-106 that are allowed to be identified as charge contributors at any particular time. It should be appreciated that the charge contributor threshold may be determined based on various factors, such as, for instance, the number of energy storage systems contained within the energy storage farm, the power capabilities of the energy storage systems, the size of the power request(s) received by the energy storage farm and/or the like. As shown in FIG. 4, if the number of pre-existing charge contributors in the energy storage farm is less than the charge contributor threshold, the method 200 may, at (212), include identifying the previously determined candidate charge contributor as an actual charge contributor. However, if the number of charge contributors is equal to or greater than the charge contributor threshold, method (200) may, at (214) include identifying the previously determined candidate charge contributor as a discharge contributor.

At (216), the method 200 may include controlling the operation of the energy storage farm such that power distribution within the farm is biased so as to increase the SOC of the energy storage systems identified as charge contributors prior to increasing the SOC of the energy storage systems identified as discharge contributors. Specifically, in a particular embodiment, the SOC of each charge contributor may be driven to its TOC state before the SOCs of any of the discharge contributors are increased.

For instance, during a charging event to support a service power request, the energy storage system(s) identified as a charge contributor(s) may absorb power to increase the SOC of such charge contributor(s). In such instance, once each charge contributor(s) reaches its TOC state, the energy storage systems identified as discharge contributor(s) may then begin to absorb energy to increase the SOC of such discharge contributor(s). Conversely, during a discharging event following the receipt of a power request, the discharge contributor(s) may be configured to serve as the primary source of discharge power for meeting the power request. Specifically, in one embodiment, if the cumulative power capability of the discharge contributor(s) is equal to or greater than the power demand associated with the power request, power may be discharged solely by the discharge contributor(s). However, if the power demand exceeds the cumulative power capability of the discharge contributor(s), the charge contributor(s) may be utilized to deliver the excess power requirements.

As indicated above, the present subject matter is also directed to a two-stage power distribution process. Specifically, in several embodiments, the two-stage power distribution process may be utilized in response to a power distribution input associated with a discharging event or a charging event for an energy storage farm. For example, a power request may be received that is associated with a request for outputting a given amount of power from the energy storage farm. Alternatively, a charging input may be received that is associated with receiving a given amount of power for charging the various energy storage systems within the farm. As will be described below, during the first stage of the power distribution process, an initial amount of power may be distributed based at least in part on the respective SOCs of each energy storage system within the energy storage farm. Thereafter, during the second stage, an unallocated amount of power may be redistributed among the energy storage systems based at least in part on the remaining power capabilities of the energy storage systems after the initial power distribution.

Figure 5:
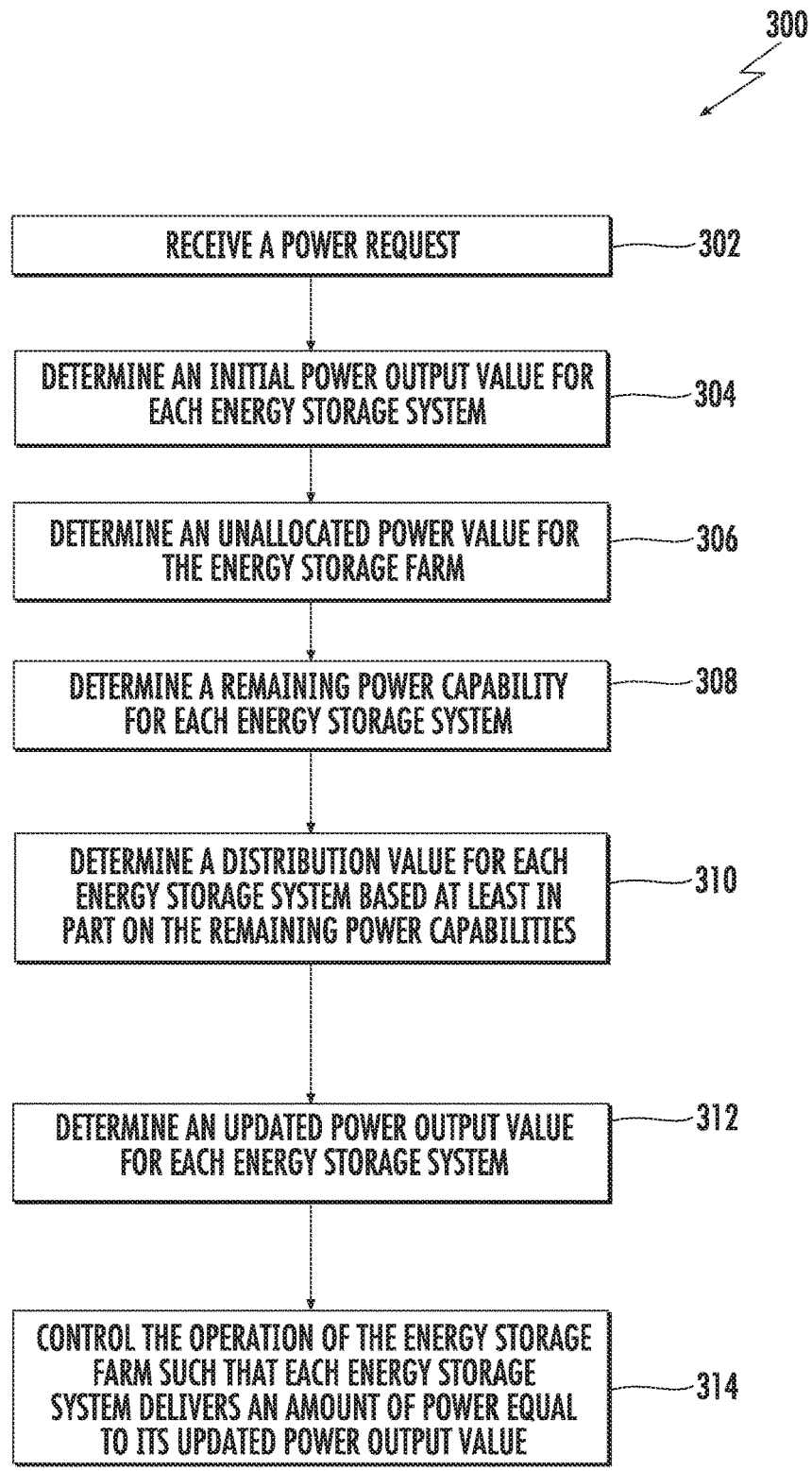
FIG. 5 depicts a flow diagram of an example method for distributing power in an energy storage farm according to example embodiments of the present disclosure, particularly illustrating a two-stage power distribution methodology associated with discharging power from the energy storage farm.

For instance, FIG. 5 depicts a flow diagram of an example method 300 for distributing power within an energy storage system according to example embodiments of the present disclosure, particularly illustrating one embodiment of the disclosed two-stage power distribution process during a discharge event. At (302), method 300 may include receiving a power request. The power request may generally be associated with a power output to be discharged from the energy storage farm. For example, a power request may be received from a power consumer requesting that a specific amount of power be supplied to the power consumer over a given time period.

In response to the power request, power can be distributed according to the disclosed two-stage process. Specifically, as indicated above, an initial amount of power may be distributed during the first stage of the process. For instance, at (304), method 300 may include determining an initial power output value for each energy storage system contained within the energy storage farm. In general, the initial power output value may correspond to an initial amount of power allocated to each energy storage system for discharge in response to the received power request. In several embodiments, the initial power output values may be determined as a function of both the power request and the respective SOCs of each energy storage system within the storage farm. For instance, in a particular embodiment, the initial power output value for a given energy storage system may be determined by multiplying a normalized SOC value for such energy storage system (e.g., the SOC of the energy storage system divided by the sum of the SOCs of all of the energy storage systems) by the power output demand associated with the power request. Thus, for example, assuming that a power request is received that demands 1.5 megawatts (MW) of power to be supplied from the energy storage farm and the normalized SOC value for one of the energy storage systems within the farm is 0.60, the initial power output value assigned to such energy storage system may correspond to 0.9 MW (i.e., 1.5 MW×0.60=0.9 MW).

It should be appreciated that, in one embodiment, the initial power output value for each energy storage system may be limited to a maximum value corresponding to its power capacity (i.e., the total amount of watt-hours available for discharge by an energy storage system). For instance, using the example described immediately above, if the energy storage system has a power capacity of 1 MW hour (MWh), the initial power output value for such energy storage system may be set at the calculated value of 0.9 MW. However, if the energy storage system, instead, has a power capacity of 0.75 MWh, the initial power output value for the energy storage system may be limited to 0.75 MW.

Referring still to FIG. 5, at (306), the method 300 may include determining an unallocated power value for the energy storage farm. In general, the unallocated power value may correspond to the amount of discharge power remaining to be allocated to the energy storage systems following the first stage of power distribution. Thus, in several embodiments, the unallocated power value may be determined as a function of both the power request and the initial power output values assigned to the energy storage systems during the first stage of the power distribution. For instance, in a particular embodiment of the present subject matter, the unallocated power value may be equal to the difference between the power request and the sum of the initial power output values for the various energy storage systems contained within the energy storage farm.

As indicated above, during the second stage of power distribution, an amount of power equal to the unallocated power value may be redistributed throughout the energy storage farm. Specifically, in several embodiments, the unallocated power may be redistributed based at least in part on the remaining amount of power that each energy storage system within the energy storage farm is capable of outputting (assuming that each energy storage system was commanded to output a total amount of power corresponding to its initial power output value determined during the first stage). For instance, at (308), the method 300 may include determining a remaining power capability for each energy storage system within the energy storage farm. As described above, the power capability of an energy storage system may generally correspond to the total amount of power that is available for charge or discharge from the energy storage system. Accordingly, as used herein, the remaining power capability of a given energy storage system may generally correspond to the remaining amount of power available for discharge from the energy storage system after the initial power output value for the energy storage system has been allocated to such energy storage system. In other words, the remaining power capability of an energy storage system may be equal to the difference between the power capability of the energy storage system and the initial power output value determined for such energy storage system.

As shown in FIG. 5, at (310), the method 300 may also include determining a distribution value for each energy storage system. In general, the distribution value may correspond to a proportional modifier calculated based on the respective remaining power capabilities of the energy storage systems. Specifically, in several embodiments, the distribution value determined for each energy storage system may correspond to the proportion of the remaining power capability of such energy storage system relative to the total remaining power capability of all of the energy storage systems within the energy storage farm. For instance, in one embodiment, the distribution value for a given energy storage system may be determined by dividing the remaining power capability of the energy storage system by the sum of the remaining power capabilities of each energy storage system.

At (312), the method 300 may include determining an updated power output value for each energy storage system within the energy storage farm. In general, the updated power output value for a given energy storage system may correspond to the initial amount of power allocated to the energy storage system in the first stage of power distribution (i.e., its initial power output value) plus any additional amount of power that is allocated to the energy storage system during the second stage of power distribution. In this regard, the additional amount of power that is added to the initial power output value for each energy storage system may be determined as a function of both the unallocated power remaining after the first stage of power distribution and the distribution value calculated for each energy storage system. For instance, in one embodiment, the additional amount of power to be added for a given energy storage system during the second stage of power distributing may be calculated by multiplying the unallocated power value by the distribution value associated with such energy storage system. This additional amount of power may then be added to the initial power output value for the energy storage system in order to determine its corresponding updated power output value.

It should be appreciated that, when an amount of unallocated power exists following the first stage of the power distribution, the updated power output value for at least one of the energy storage systems within the energy storage farm will be equal to an amount of power that is greater than the initial output power value determined for such energy storage system(s). However, it should also be appreciated that the updated power output value determined for one or more of the energy storage systems may also be equal to the initial power output value initially calculated for such energy storage system(s). For instance, if the initial power output value assigned to an energy storage system is equal to its power capability, no additional amount of power may be allocated to the energy storage system during the second stage of power distribution (e.g., due to the distribution value of such energy storage system being equal to zero).

Referring still to FIG. 5, at (314), the method 300 may also include controlling the operation of the energy storage farm such that each energy storage system within the energy storage farm delivers an amount of power equal to its updated power output value. Specifically, using the calculations described above, the sum of the updated power output values determined for the energy storage systems may be equal to the power demand associated with the received power request (assuming the total power demand does not exceed the sum of the power capacities of the energy storage systems). Accordingly, after determining the updated power output values for each energy storage system, suitable controls commands may be transmitted to the energy storage systems such that each energy storage system discharges power in an amount equal to its corresponding updated power output value so as to meet the power demand required by the power request.

Figure 6A:
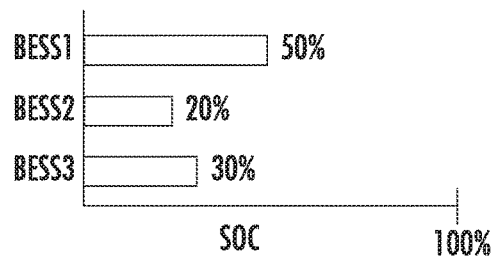
FIGS. 6A-6C depict graphical representations of an example power distribution in an energy storage farm according to example embodiments of the present disclosure, particularly illustrating an example application of the method described with reference to FIG. 5.
Figure 6B:
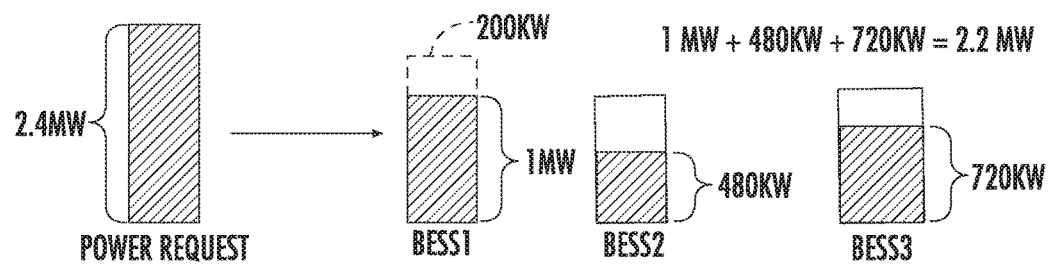
Figure 6C:
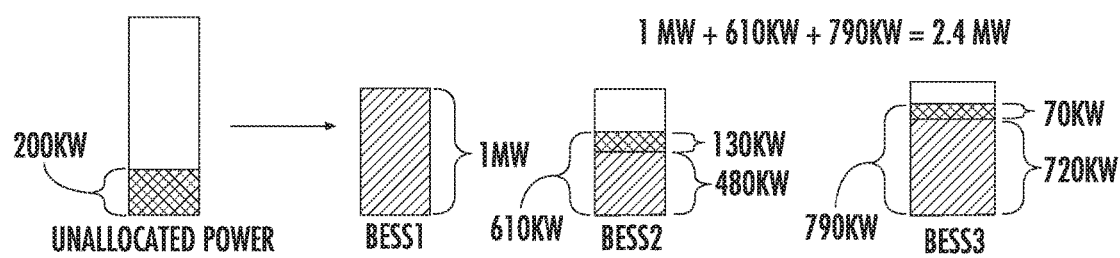

Referring now to FIGS. 6A-6C, graphical representations of an example power distribution utilizing the two-stage process described above with reference to FIG. 5 are illustrated according to example embodiments of the present disclosure. In particular, FIGS. 6A-6C depict an energy storage farm including three energy storage systems, namely BESS 1, BESS 2, and BESS 3. For purposes of the example being described, it will be assumed that each energy storage system has a power capacity of 1 MWh (i.e., the total amount of watt-hours available for discharge) and a power capability of 1 MW.

As particularly shown in FIG. 6A, each energy storage system has an initial SOC corresponding to the percentage of the full capacity that is currently available for further discharge. Specifically, in the illustrated embodiment, BESS 1 has a SOC of 50%, BESS 2 has a SOC of 20% and BESS 3 has a SOC of 30%. As will be described below, each energy storage system may be assigned power output values based on their respective SOCs. Accordingly, given the differing SOCs between the energy storage systems, each storage system may be assigned a different power output value to ensure that the power delivered from the energy storage farm is distributed in a manner that provides for balanced power discharge from the various energy storage systems.

As shown in FIG. 6B, a power request has been received by the energy storage farm requesting that 2.4 MW be delivered to a given power consumer. As described above with reference to FIG. 5, responsive to such power request, the energy storage farm may be configured to output an amount of power equal to the power request by allocating power to be discharged from the energy storage systems according to the disclosed two-stage process. In this regard, FIG. 6B illustrates the initial power allocation performed during the first stage of the power distribution, wherein each energy storage system is assigned an initial power output value (e.g., by implementing (304) of the method 300 shown in FIG. 4). For example, in one embodiment, the initial power output values for the energy storage systems may be calculated by multiplying a normalized SOC value determined for each energy storage system by the power output demand associated with the power request. As indicated above, the normalized SOC value may be determined for a given energy storage system by dividing the SOC for such energy storage system by the sum of the SOCs of all of the energy storage systems within the farm. For instance, in the illustrated embodiment, the initial power output value for BESS 1 may correspond to 1.2 MW (i.e., 0.50/(0.50+0.20+0.30)×2.4 MW=1.2 MW) and the initial power output value for BESS 2 may correspond to 480 kilowatts (KW) (i.e., 0.20/(0.50+0.20+0.30)×2.4 MW=480 KW). In the same manner, the initial power output value for BESS 3 may correspond to 720 KW (i.e., 0.30/(0.50+0.20+0.30)×2.4 MW=720 KW). However, as indicated above, the initial power output value determined for an energy storage system may be limited by its power capability. Thus, in the illustrated embodiment, the initial power output value for BESS 1 may be limited to 1 MW. As such, the initial power output value for BESS 1 may be reduced from 1.20 MW to 1 MW (as indicated in FIG. 6B).

As shown in FIG. 6B, the sum of the initial power output values assigned to the energy storage systems is equal 2.2 MW. Since this amount is less than the power demand required by the power request, the energy storage farm has not yet allocated enough power to meet the power request. Specifically, in the illustrated example, an unallocated power value of 200 KW exists (i.e., 2.4 MW−2.2 MW=200 KW). Accordingly, as described above, the second stage of power distribution may be utilized to distribute this unallocated power throughout the energy storage farm.

FIG. 6C depicts the second stage of power distribution. As shown, to account for the unallocated power, the unallocated power value of 200 KW may be redistributed among the energy storage systems. As indicated above with reference to the method 300 shown in FIG. 5, such unallocated power may be redistributed based at least in part on the remaining power capabilities of the energy storage systems. Specifically, in several embodiments, the remaining power capabilities of the energy storage systems may be determined by subtracting the initial power output value assigned to each energy storage system by its power capability. For instance, in the illustrated embodiment, the remaining power capability of BESS 1 is zero since its initial power output value is equal to its power capability. Accordingly, no amount of the unallocated 200 KW will be redistributed to BESS 1. However, since BESS 2 was only initially allocated 480 KW, the remaining power capability of such energy storage system may be determined to be 520 KW (i.e., 1 MW−480 KW=520 KW). In the same manner, the remaining power capability of BESS 3 may be determined to be 280 KW (i.e., 1 MW−720 KW=280 KW).

Given the remaining power capabilities of the energy storage systems, the unallocated 200 KW may be distributed between BESS 2 and BESS 3 during the second stage of power distribution based on each energy storage system's remaining power capability as a proportion of the total remaining power capability in the energy storage farm. Specifically, as described above with reference to method element (310) of the method 300 shown in FIG. 5, a distribution value may be determined for each of the energy storage systems. For instance, in the illustrated embodiments, the energy storage farm has a total remaining capability of 800 KW, with BESS 2 including 65% of the remaining power capability (i.e., 520 KW/800 KW=0.65) and BESS 3 including 35% of the remaining power capability (i.e., 280 KW/800 KW=0.35). As such, a distribution value of 0.65 may be determined for BESS 2 and a distribution value of 0.35 may be determined for BESS 3. Similarly, given that BESS 1 does not contribute any remaining power capability to the total remaining power capability of the energy storage farm, a distribution value of zero may be determined for BESS 1.

As indicated above with reference to the method 300 shown in FIG. 5, after determining the distribution values, an updated power output value may then be calculated for each of the energy storage systems. Specifically, in several embodiments, the updated power output values may be calculated by adding an additional amount of power determined for each energy storage system based on its distribution value to the initial power output value determined for such energy storage system. As described above, this additional amount of power may be calculated by multiplying the distribution value determined for each energy storage system by the unallocated power remaining after the first stage of power distribution. For instance, in the illustrated embodiment, BESS 1 may be allocated an additional 0 KW of the unallocated 200 KW (i.e., 0.0×200 KW=0 KW), BESS 2 may be allocated an additional 130 KW of the unallocated 200 KW (i.e., 0.65×200 KW=130 KW) and BESS 3 may be allocated an additional 70 KW of the unallocated 200 KW (i.e., 0.35×200 KW=70 KW). The updated power output values may then be determined for the energy storage systems by adding the additional power allocation provided for each energy storage system with its initial power output value. For instance, as shown in FIG. 6C, the updated power output value for BESS 1 may be determined to be 1 MW (i.e., 1 MW+0=1 MW), the updated power output value for BESS 2 may be determined to be 610 KW (i.e., 480 KW+130 KW=610 KW) and the updated power output value for BESS 3 may be determined to be 790 KW (i.e., 720 KW+70 KW=790 KW). As described above, each energy storage system may then deliver an amount of power equal to its updated power output value to ensure that the power output demand associated with the power request is met. For instance, in the illustrated embodiment, the sum of the updated power outputs for the energy storage systems is equal to the initial power request (i.e., 1 MW+610 KW+790 KW=2.4 MW).

As indicated above, the methods 200, 300 described above with reference to FIGS. 4 and 5 may be implemented individually as stand-alone power distribution methods. Alternatively, the methods 200, 300 may be implemented in combination with one another. Specifically, in several embodiments, power may be distributed across an energy storage farm so as to take into account the charge contributor(s) present within the energy storage farm. For instance, during the first stage of the two-stage power distribution process described above with reference to FIG. 5, the charge contributor(s) present within the energy storage farm may be excluded from power distribution (e.g. by setting the initial power output value for each charge contributor(s) at zero).

Figure 7:
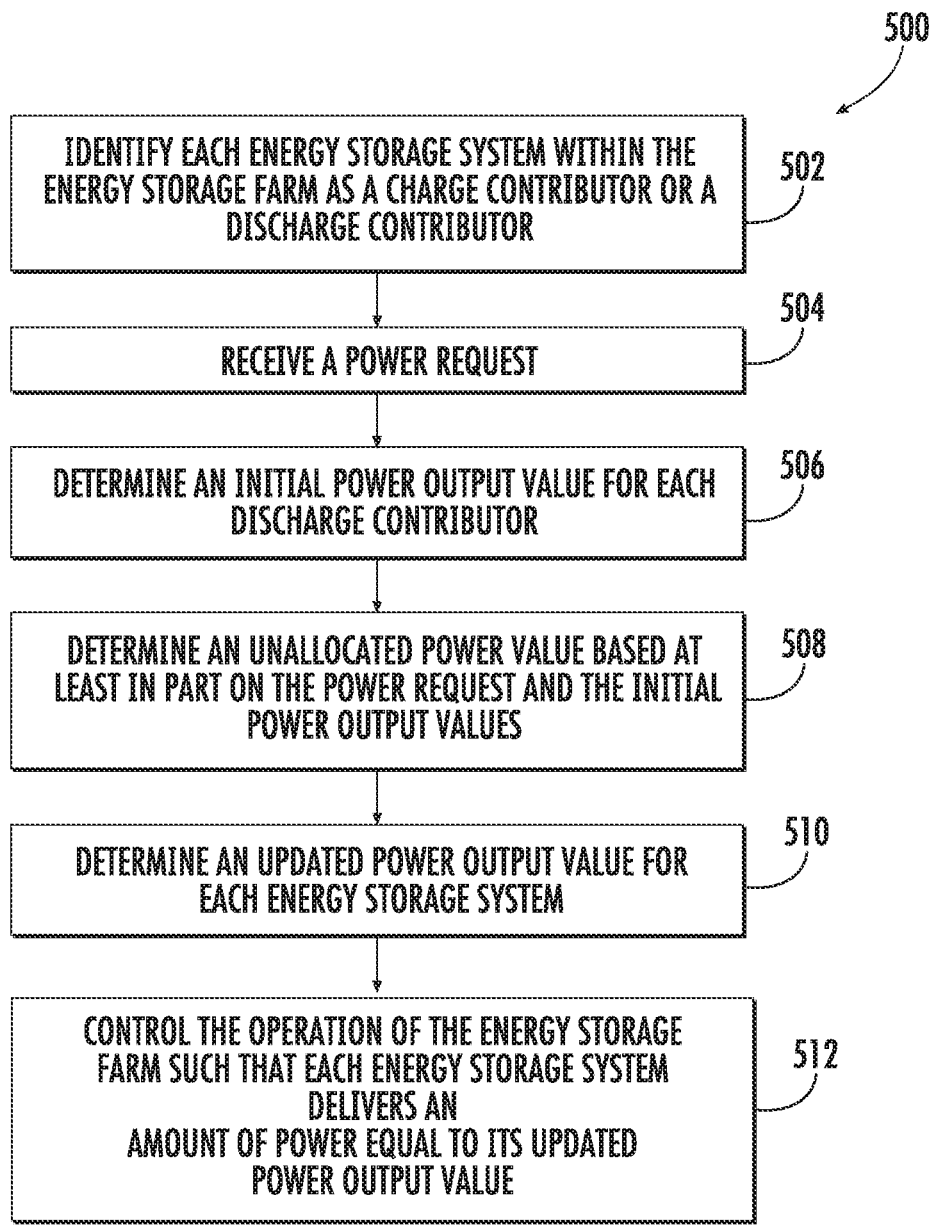
FIG. 7 depicts a flow diagram of an example method for distributing power in an energy storage farm according to example embodiments of the present disclosure, particularly illustrating one embodiment of a two-stage power distribution methodology to be utilized in connection with the implementation of a passive maintenance scheme.

For instance, FIG. 7 depicts a flow diagram of an example method 500 that combines aspects of the disclosed passive maintenance scheme with aspects of the disclosed two-stage power distribution process according to example embodiments of the present disclosure. Specifically, as shown in FIG. 7, at (502), the method 500 may include identifying each energy storage system within the energy storage farm as either a charge contributor or a discharge contributor. Such identifications can be made in accordance with the method 200 described above with reference to FIG. 4.

Additionally, at (504), the method 500 may include receiving a power request associated with a power output to be discharged from the energy storage farm. Thereafter, at (506), the method 500 may include determining an initial power output value for each energy storage system identified as a discharge contributor at (502). As indicated above, the initial power output values may be determined based at least in part on the respective SOCs of the energy storage systems. For example, in one embodiment, the initial power output value for each discharge contributor may be determined by multiplying a normalized SOC value calculated for each discharge contributor by the power output demand associated with the power request. The normalized SOC value for a given discharge contributor may be determined by dividing the SOC for such discharge contributor by the sum of the SOCs of each discharge contributor in the energy storage farm. Additionally, it should be appreciated that, in several embodiments, each energy storage system that has been identified as a charge contributor may be assigned an initial power output value of zero. As a result, all of the power allocated during the first stage of power distribution will be allocated to the discharge contributors.

Referring still to FIG. 7, at (508), the method 500 may include determining an unallocated power output value for the energy storage farm based at least in part on the power output demand associated with the power request and the initial power output value(s) determined for the discharge contributor(s). For instance, as described above, the unallocated power value may be determined by subtracting the sum of the initial power output values determined at (506) from the power output demand associated with the power request. Additionally, at (510), the method 500 may include determining an updated power output value for each energy storage system within the farm. As described above with reference to the method 300 shown in FIG. 5, the updated power output values may be determined by adding an additional amount of power determined for each energy system based on the unallocated power value to the initial power output value determined for each energy storage system. In such an embodiment, as indicated above, the additional amount of power may be determined by multiplying a distribution value calculated for each energy storage system by the unallocated power remaining after the first-stage of power distribution.

After determining an updated power output value for each energy storage system, the method 500 may, at (512), include controlling the operation of the energy storage farm such that each energy storage system delivers an amount of power equal to its updated power value. In such an embodiment, the sum of the updated power values may be equal to the power demand associated with the power request.

Figure 8A:
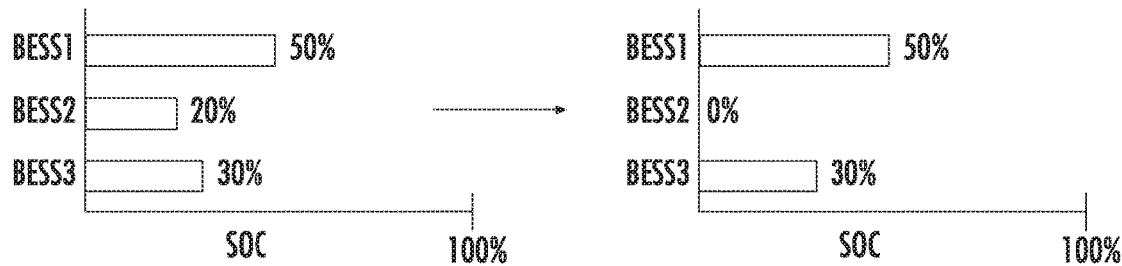
FIGS. 8A-8C depict graphical representations of an example power distribution in an energy storage farm according to example embodiments of the present disclosure, particularly illustrating an example application of the method described with reference to FIG. 7.
Figure 8B:
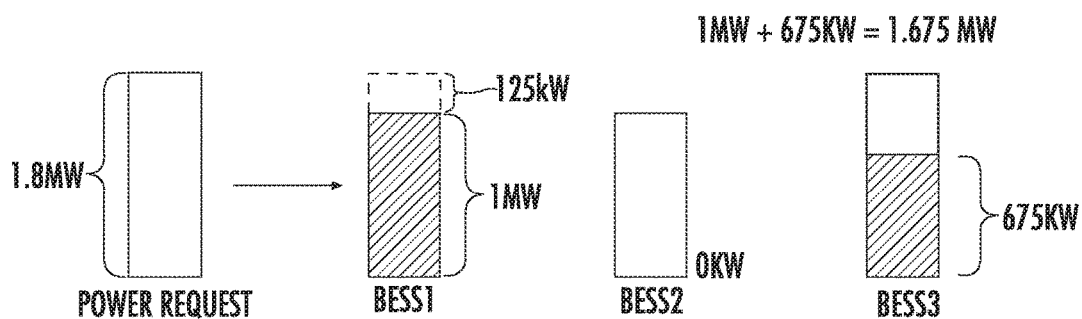
Figure 8C:
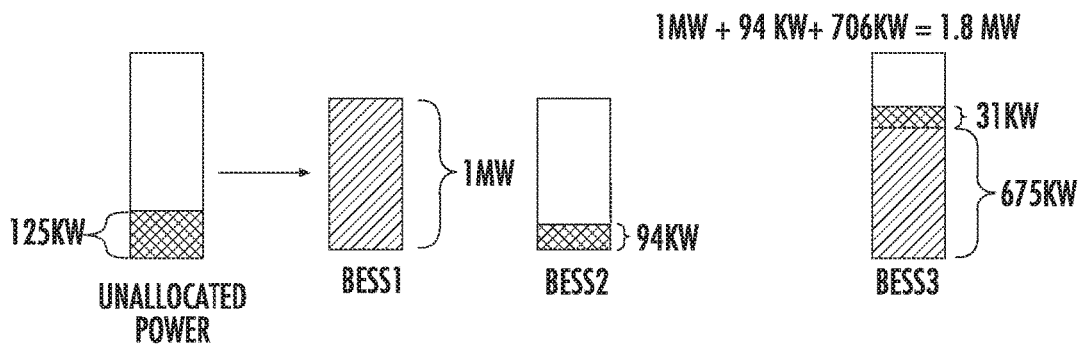

Referring now to FIGS. 8A-8C, graphical representations of an example power distribution utilizing the method 500 described above with reference to FIG. 7 are illustrated according to example embodiments of the present disclosure. Specifically, the example shown in FIGS. 8A-8C simply illustrates a modification of the energy storage farm configuration described above with reference to FIGS. 6A-6C in which it is assumed that BESS 1 and BESS 3 have been identified as discharge contributors and BESS 2 has been identified as a charge contributor. As shown, BESS 1 has a current SOC of 50%, BESS 2 has a current SOC of 20% and BESS 3 has a current SOC of 30%. According to the method 500 described above, during a discharge event occurring in response to a power request, the discharge contribution of BESS 2 may be turned off during the first stage of power distribution such that BESS 2 is not allocated any initial power output value (or is allocated a value of zero). Thus, as shown in FIG. 8A, it may be assumed that the SOC of BESS 2 is 0% for purposes of calculating the initial power output values.

As shown in FIG. 8B, a power request has been received by the energy storage farm requesting that 1.8 MW be delivered to a given power consumer. Thereafter, as described above with reference to the method 500 shown in FIG. 7, an initial power allocation may be performed during the first stage of the power distribution, wherein each discharge contributor is assigned an initial power output value based on its normalized SOC value. For instance, in the illustrated embodiment, the initial power output value for BESS 1 may correspond to 1.125 MW (i.e., 0.50/(0.50+0.30)×1.8 MW=1.125 MW) and the initial power output value for BESS 3 may correspond to 675 KW (0.30/(0.50+0.30)×1.8 MW=675 KW). As the power capability of BESS 1 is 1 MW, the initial power output value of BESS 1 may be limited to 1 MW. Additionally, since BESS 2 has been identified as a charge contributor, its initial power output value may be set at zero.

As shown in FIG. 8B, the sum of the initial power output values assigned to the discharge contributors is equal to 1.675 MW. Since this amount is less than the power demand required by the power request, the energy storage farm has not yet allocated enough power to meet the power request. Specifically, in the illustrated example, an unallocated power value of 125 KW exists (i.e., 1.8 MW–1.675 MW=125 KW). As shown in FIG. 8C, to account for this unallocated power, the unallocated power value of 125 KW may be redistributed among the energy storage systems based on their remaining power capabilities. For instance, in the illustrated embodiment, since BESS 1 was initially allocated 1 MW, the remaining power capability of such energy storage system may be determined to be 0.0 KW (i.e., 1 MW–1 MW=0.0 KW). Further, since BESS 2 was initially allocated 0.0 KW, the remaining power capability of such energy storage system may be determined to be 1 MW (i.e., 1 MW–0.0 KW=1 MW). In the same manner, the remaining power capability of BESS 3 may be determined to be 325 KW (i.e., 1 MW–675 KW=325 KW).

Given the remaining power capabilities, the unallocated 125 KW may be distributed between BESS 2 and BESS 3 during the second stage of power distribution based on each energy storage system's remaining power capability as a proportion of the total remaining power capability in the energy storage farm. For instance, in the illustrated embodiment, the energy storage farm has a total remaining capability of 325 KW, with BESS 1 having 0% of the remaining power capability (i.e., 0 KW/1.325 MW=0.0), BESS 2 having 75.5% of the remaining power capability (i.e., 1 MW/1.325 MW=0.755), and BESS 3 having 24.5% of the remaining power capability (i.e., 325 KW/1.325 MW=0.245). As such, a distribution value of zero may be determined for BESS 1, a distribution value of 0.755 may be determined for BESS 2 and a distribution value of 0.245 may be determined for BESS 3.

Thereafter, an updated power output value may be determined for each energy storage system. As indicated above, the updated power output values may be calculated by adding an additional amount of power determined for each energy storage system based on its distribution value to the initial power output value determined for such energy storage system. For instance, in the illustrated embodiment, BESS 1 may be allocated an additional 0.0 KW of the unallocated 125 KW (i.e., 0.00×125 KW=0.08 KW), BESS 2 may be allocated an additional 94 KW of the unallocated 125 KW (i.e., 0.755×125 KW=94 KW), and BESS 3 may be allocated an additional 31 KW of the unallocated 125 KW (i.e., 0.245×125 KW=31 KW). The updated power output values may then be determined for the energy storage systems by adding the additional power allocation provided for each energy storage system with its initial power output value. For instance, as shown in FIG. 6C, the updated power output value for BESS 1 may be determined to be 1 MW (i.e., 1 MW+0=1 MW), the updated power output value for BESS 2 may be determined to be 94 KW (i.e., 0+94 KW=94 KW) and the updated power output value for BESS 3 may be determined to be 706 KW (i.e., 675 KW+31 KW=706 KW). As described above, each energy storage system may then deliver an amount of power equal to its updated power output value to ensure that the power output demand associated with the power request is met. For instance, in the illustrated embodiment, the sum of the updated power outputs for the discharge contributors is equal to the initial power request (i.e., 1 MW+94 KW+706 KW=1.8 MW).

In alternative embodiments, it should be appreciated that, during the second stage of power distribution, the unallocated power value may be redistributed first among the discharge contributors that have any remaining power capability prior to allocating any output power to the charge contributors. For instance, using the numbers provided in the example described above, the unallocated power value of 125 KW may be assigned solely to BESS 3 for discharge since BESS 3 has sufficient remaining power capability to handle the unallocated power from the first stage of power distribution. In such instance, BESS 2 may only be required to discharge power if the unallocated power value exceeds the remaining power capability of BESS 3. For example, if the power request was equal to 2.1 MW instead of 1.8 MW and assuming that each energy storage system has a power capability of 1 MW, the discharge contributors (e.g., BESS 1 and BESS 3) may be required to output power at their full capability (e.g., by commanding each energy storage system to output 1 MW). The excess power (e.g., 0.1 MW) may then be allocated to the charge contributor(s) (e.g., BESS 2) for discharge.

As indicated above, the two-stage power distribution process can also be implemented during a charging event in which a given amount of power is received by an energy storage farm for charging its respective energy storage system. Specifically, in several embodiments, in response to a power distribution input corresponding to a charging input, an initial amount of power may be distributed during the first stage of power distribution based at least in part on the respective SOCs of each energy storage system within the energy storage farm. Thereafter, during the second stage, an unallocated amount of power may be redistributed among the energy storage systems based at least in part on the remaining power capabilities of the energy storage systems after the initial power distribution.

Figure 9:
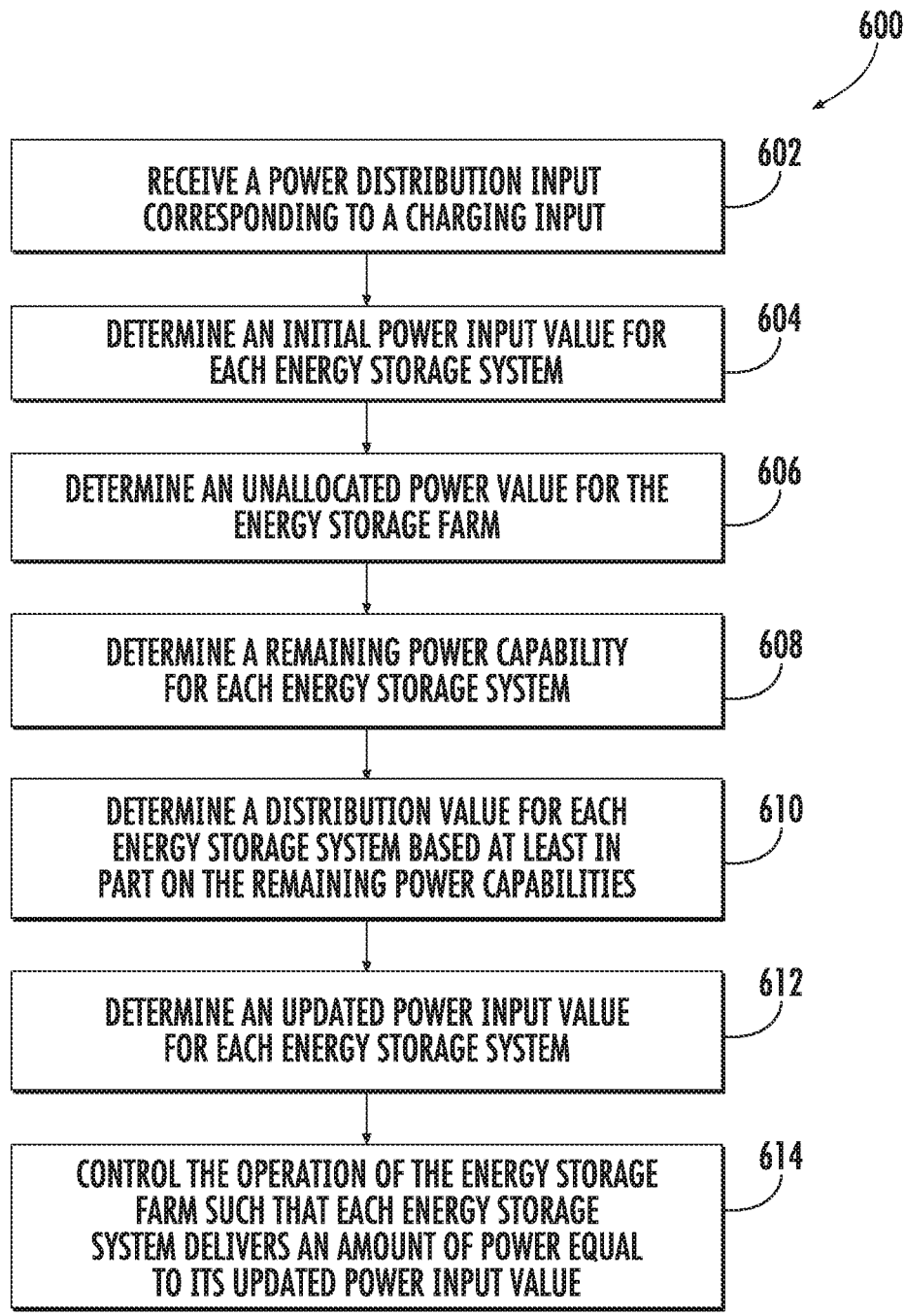
FIG. 9 depicts a flow diagram of an example method for distributing power in an energy storage farm according to example embodiments of the present disclosure, particularly illustrating a two-stage power distribution methodology associated with inputting power to the energy storage farm.

For instance, FIG. 9 depicts a flow diagram of a method 600 for distributing power within an energy storage system according to example embodiments of the present disclosure, particularly illustrating an example application of the disclosed two-stage power distribution process during a charging event. As shown in FIG. 9, at (602), the method 600 may include receiving a power distribution input corresponding to a charging input. As indicated above, the charging input may generally be associated with a power input to be received by the energy storage farm.

In response to the charging input, power can be distributed according to the disclosed two-stage process. Specifically, as indicated above, an initial amount of power may be distributed during the first stage of the process. For instance, at (604), the method 600 may include determining an initial power input value for each energy storage system contained within the energy storage farm. In general, the initial power input value may correspond to an initial amount of power allocated to each energy storage system for charging. In several embodiments, the initial power input values may be determined as a function of both the charging input and the respective SOCs of each energy storage system within the storage farm.

For instance, in a particular embodiment, the initial power input value for a given energy storage system may be determined by first calculating a modified SOC for the energy system by subtracting the current SOC of the energy storage system from a value of one. Thereafter, based on its modified SOC, a normalized SOC value may be determined for the energy storage system (e.g., the modified SOC of the energy storage system divided by the sum of the modified SOCs of all of the energy storage systems). The initial power input value may then be determined by multiplying the normalized SOC value for such energy storage system by the charging input received as the power distribution input. Thus, for example, assuming that a charging input is received that provides for 1.5 MW of power to be allocated for charging within the energy storage farm between first and second energy storage system and that the first and second energy storage systems have SOCs of 30% and 60%, respectively, a modified SOC may be determined for the first energy storage system that is equal to 70% (i.e., 1−0.30=0.70) and a modified SOC may be determined for the second energy storage system that is equal to 40% (i.e., 1−0.60=0.40). Thereafter, an initial power input value may, for example, be determined for the first energy storage system that is equal to 0.9545 MW (i.e., 1.5 MW×(0.70)/(0.70+0.40)=0.9545 MW).

Referring still to FIG. 9, at (606), the method 600 may include determining an unallocated power value for the energy storage farm. In general, the unallocated power value may correspond to the amount of power remaining to be allocated to the energy storage systems following the first stage of power distribution. Thus, in several embodiments, the unallocated power value may be determined as a function of both the charging input and the initial power input values assigned to the energy storage systems during the first stage of the power distribution.

As indicated above, during the second stage of power distribution, an amount of power equal to the unallocated power value may be redistributed throughout the energy storage farm. Specifically, in several embodiments, the unallocated power may be redistributed based at least in part on the remaining amount of power that each energy storage system within the energy storage farm is capable of receiving (assuming that each energy storage system was commanded to receive a total amount of power corresponding to its initial power input value determined during the first stage). For instance, at (608), the method 600 may include determining a remaining power capability for each energy storage system within the energy storage farm.

As shown in FIG. 9, at (610), the method 600 may also include determining a distribution value for each energy storage system. As described above, the distribution value may correspond to a proportional modifier calculated based on the respective remaining power capabilities of the energy storage systems. At (612), the method 600 may include determining an updated power input value for each energy storage system within the energy storage farm. In general, the updated power input value for a given energy storage system may correspond to the initial amount of power allocated to the energy storage system in the first stage of power distribution (i.e., its initial power input value) plus any additional amount of power that is allocated to the energy storage system during the second stage of power distribution. In this regard, the additional amount of power that is added to the initial power input value for each energy storage system may be determined as a function of both unallocated power remaining after the first stage of power distribution and the distribution value calculated for each energy storage system.

It should be appreciated that, when an amount of unallocated power exists following the first stage of the power distribution, the updated power input value for at least one of the energy storage systems within the energy storage farm will be equal to an amount of power that is greater than the initial input power value determined for such energy storage system(s). However, it should also be appreciated that the updated power input value determined for one or more of the energy storage systems may also be equal to the initial power input value initially calculated for such energy storage system(s). For instance, if the initial power input value assigned to an energy storage system is equal to its power capability, no additional amount of power may be allocated to the energy storage system during the second stage of power distribution (e.g., due to the distribution value of such energy storage system being equal to zero).

Referring still to FIG. 9, at (614), the method 600 may include controlling the operation of the energy storage farm such that each energy storage system within the energy storage farm receives an amount of power equal to its updated power input value. Specifically, using the calculations described above, the sum of the updated power input values determined for the energy storage systems may be equal to the charging input associated with the received power distribution input (assuming the total charging input does not exceed the sum of the power capacities of the energy storage systems). Accordingly, after determining the updated power input values for each energy storage system, suitable controls commands may be transmitted to the energy storage systems such that each energy storage system receives power in an amount equal to its corresponding updated power input value so as to meet the charging input.

Figure 10A:
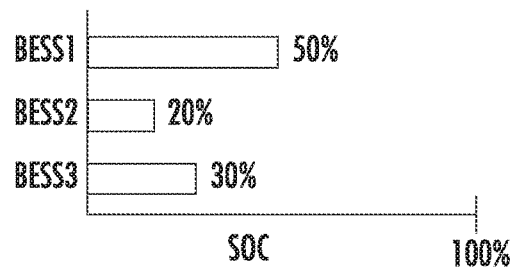
FIGS. 10A-10C depict graphical representations of an example power distribution in an energy storage farm according to example embodiments of the present disclosure, particularly illustrating an example application of the method described with reference to FIG. 9.
Figure 10B:
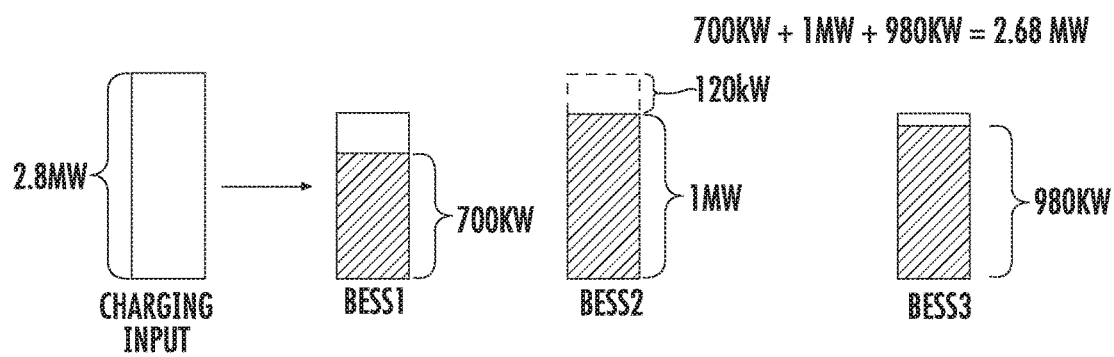
Figure 10C:
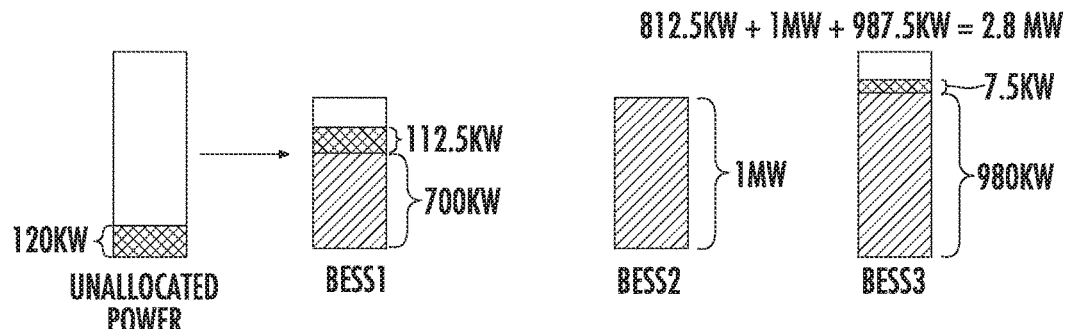

Referring now to FIGS. 10A-10C, graphical representations of an example power distribution utilizing the two-stage process described above with reference to FIG. 9 are illustrated according to example embodiments of the present disclosure. In particular, FIGS. 10A-10C depict the energy storage farm described above with reference to FIGS. 6A-6C during a charging event.

As particularly shown in FIG. 10A, each energy storage system has an initial SOC corresponding to the percentage of the full capacity that is currently available for further discharge. Specifically, in the illustrated embodiment, BESS 1 has a SOC of 50%, BESS 2 has a SOC of 20% and BESS 3 has a SOC of 30%. As will be described below, each energy storage system may be assigned power input values based on their respective SOCs. Accordingly, given the differing SOCs between the energy storage systems, each storage system may be assigned a different power input value to ensure that the power received by the energy storage farm is distributed in a manner that provides for balanced power charge for the various energy storage systems.

As shown in FIG. 10B, a charging input has been received by the energy storage farm allocating 2.8 MW to be received by the energy storage farm. As described above with reference to FIG. 9, responsive to such charging input, the energy storage farm may be configured to input an amount of power equal to the charging input by allocating power to be received by the energy storage systems according to the disclosed two-stage process. In this regard, FIG. 10B illustrates the initial power allocation performed during the first stage of the power distribution, wherein each energy storage system is assigned an initial power input value (e.g., by implementing (604) of the method 600 shown in FIG. 9). As indicated above, the initial power input values for the energy storage systems may, in one embodiment, be calculated by determining a normalized SOC value for each energy storage system based on its modified SOC (i.e., one minus the current SOC for the energy storage system). The initial power input value may then be determined by multiplying the normalized SOC value for each energy storage system by the charging input. For instance, in the illustrated embodiment, the initial power input value for BESS 1 may correspond to 700 KW (i.e., $(1-0.50)/((1-0.50)+(1-0.20)+(1-0.30))\times 2.8$ MW=700 KW) and the initial power input value for BESS 2 may correspond to 1.12 MW (i.e., $(1-0.20)/((1-0.50)+(1-0.20)+(1-0.30))\times 2.8$ MW=1.12 MW). In the same manner, the initial power input value for BESS 3 may correspond to 980 KW (i.e., $(1-0.30)/((1-0.50)+(1-0.20)+(1-0.30))\times 2.8$ MW=980 KW). However, as indicated above, the initial power input value determined for an energy storage system may be limited by its power capability. Thus, in the illustrated embodiment, the initial power input value for BESS 2 may be limited to 1 MW. As such, the initial power input value for BESS 2 may be reduced from 1.12 MW to 1 MW (as indicated in FIG. 10B).

As shown in FIG. 10B, the sum of the initial power input values assigned to the energy storage systems is equal 2.68 MW. Since this amount is less than the charging input, the energy storage farm has not yet allocated all of the power to be received by the farm. Specifically, in the illustrated example, an unallocated power value of 120 KW exists (i.e., 2.8 MW−2.68 MW=120 KW). Accordingly, as described above, the second stage of power distribution may be utilized to distribute this unallocated power throughout the energy storage farm.

FIG. 10C depicts the second stage of power distribution. As shown, to account for the unallocated power, the unallocated power value of 120 KW may be redistributed among the energy storage systems. As indicated above with reference to the method 600 shown in FIG. 9, such unallocated power may be redistributed based at least in part on the remaining power capabilities of the energy storage systems. Specifically, in several embodiments, the remaining power capabilities of the energy storage systems may be determined by subtracting the initial power input value assigned to each energy storage system by its power capability. For instance, in the illustrated embodiment, the remaining power capability of BESS 2 is zero since its initial power input value is equal to its power capability. Accordingly, no amount of the unallocated 120 KW will be redistributed to BESS 2. However, since BESS 1 was only initially allocated 700 KW, the remaining power capability of such energy storage system may be determined to be 300 KW (i.e., 1 MW−700 KW=300 KW). In the same manner, the remaining power capability of BESS 3 may be determined to be 20 KW (i.e., 1 MW−980 KW=20 KW).

Given the remaining power capabilities of the energy storage systems, the unallocated 120 KW may be distributed between BESS 1 and BESS 3 during the second stage of power distribution based on each energy storage system's remaining power capability as a proportion of the total remaining power capability in the energy storage farm. Specifically, as described above with reference to method element (610) of the method 600 shown in FIG. 9, a distribution value may be determined for each of the energy storage systems. For instance, in the illustrated embodiment, the energy storage farm has a total remaining capability of 320 KW, with BESS 1 including 93.75% of the remaining power capability (i.e., 300 KW/320 KW=0.9375) and BESS 3 including 6.25% of the remaining power capability (i.e., 20 KW/320 KW=0.0625). As such, a distribution value of 0.9375 may be determined for BESS 1 and a distribution value of 0.0625 may be determined for BESS 3. Similarly, given that BESS 2 does not contribute any remaining power capability to the total remaining power capability of the energy storage farm, a distribution value of zero may be determined for BESS 2.

As indicated above with reference to the method 600 shown in FIG. 9, after determining the distribution values, an updated power input value may then be calculated for each of the energy storage systems. Specifically, in several embodiments, the updated power input values may be calculated by adding an additional amount of power determined for each energy storage system based on its distribution value to the initial power input value determined for such energy storage system. As described above, this additional amount of power may be calculated by multiplying the distribution value determined for each energy storage system by the unallocated power remaining after the first stage of power distribution. For instance, in the illustrated embodiment, BESS 2 may be allocated an additional 0 KW of the unallocated 120 KW (i.e., 0.0×120 KW=0 KW), BESS 1 may be allocated an additional 112.5 KW of the unallocated 120 KW (i.e., 0.9375×120 KW=112.5 KW) and BESS 3 may be allocated an additional 7.5 KW of the unallocated 120 KW (i.e., 0.0625×120 KW=7.5 KW). The updated power input values may then be determined for the energy storage systems by adding the additional power allocation provided for each energy storage system with its initial power input value. For instance, as shown in FIG. 10C, the updated power input value for BESS 1 may be determined to be 812.5 KW (i.e., 700 KW+112.5 KW=812.5 KW), the updated power input value for BESS 2 may be determined to be 1 MW (i.e., 1 MW+0.0=1 MW) and the updated power input value for BESS 3 may be determined to be 987.5 KW (i.e., 980 KW+7.5 KW=987.5 KW). As described above, each energy storage system may then receive an amount of power equal to its updated power input value to ensure that the power received by the energy storage farm for charging the energy storage system is fully allocated. For instance, in the illustrated embodiment, the sum of the updated power input values for the energy storage systems is equal to the initial charging input (i.e., 812.5 KW+1 MW+987.5 KW=2.8 MW).

Figure 11A:
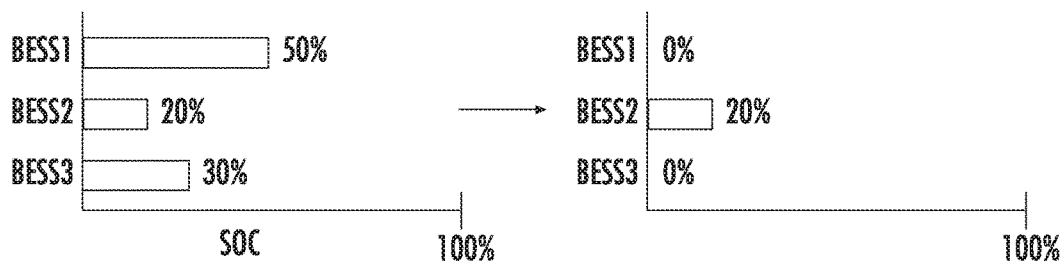
FIGS. 11A-11C depict graphical representations of an example power distribution in an energy storage farm according to example embodiments of the present disclosure, particularly illustrating an example application of a two-stage power distribution methodology to be utilized in connection with the implementation of a passive maintenance scheme during a charging event.
Figure 11B:
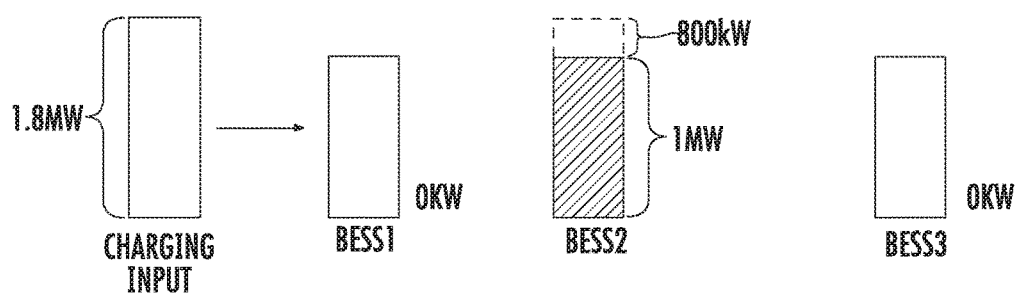
Figure 11C:
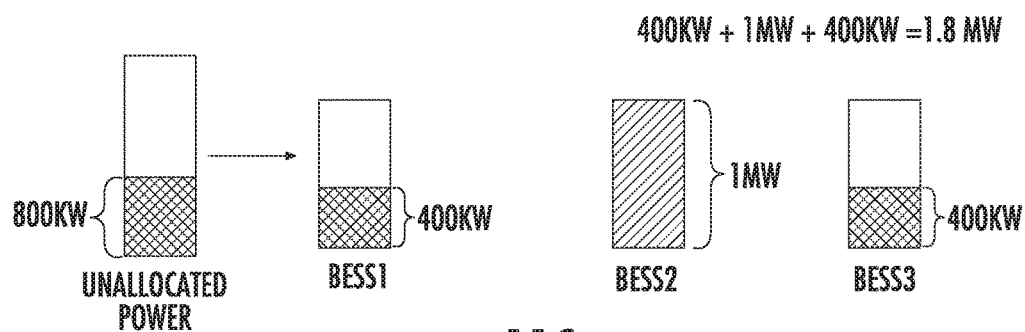

Referring now to FIGS. 11A-11C, graphical representations of another example power distribution are illustrated according to example embodiments of the present disclosure, particularly illustrating an example application of a two-stage power distribution methodology to be utilized in connection with the implementation of a passive maintenance scheme during a charging event. Specifically, the example illustrated in FIGS. 11A-11C simply provides a modification of the energy storage farm configuration described above with reference to FIGS. 10A-10C in which it is assumed that BESS 1 and BESS 3 have been identified as discharge contributors and BESS 2 has been identified as a charge contributor. As shown, BESS 1 has a current SOC of 50%, BESS 2 has a current SOC of 20% and BESS 3 has a current SOC of 30%. According to example embodiments of the present disclosure, during a charging event occurring in response to the receipt of a charging input, the charge contributions of BESS 1 and BESS 3 may be turned off during the first stage of power distribution such that BESS 1 and BESS 3 are allocated initial power input values of zero. Thus, as shown in FIG. 11A, it may be assumed that the SOCs of BESS 1 and BESS 3 are 0% for purposes of calculating the initial power input values.

As shown in FIG. 11B, a charging input has been received by the energy storage farm allocating 1.8 MW to be received by the energy storage farm. Thereafter, an initial power allocation may be performed during the first stage of the power distribution, wherein each charge contributor is assigned an initial power input value based on its SOC. In several embodiments, the initial power input value may be calculated by first determining a normalized SOC value for the charge contributor based on its modified SOC. In such embodiments, the modified SOC may be determined by subtracting the current SOC for the charging contributor from a value of one and the normalized SOC value may be determined by dividing the modified SOC of the charge contributor by the sum of the modified SOCs of each charge contributor in the energy storage farm. The initial power input value may then be determined by multiplying the normalized SOC value for the charging contributor by the charging input. For instance, in the illustrated embodiment, the initial power input value for BESS 2 may correspond to 1.8 MW (i.e., (1−0.20)/(1−0.20)×1.8 MW=1.8 MW). However, as described above, the initial power input value may be limited by the power capability of BESS 2. Accordingly, the initial power input value for BESS 2 may be set at 1 MW (as indicated in FIG. 11B). Additionally, since BESS 1 and BESS 3 have been identified as discharge contributors, their initial power input values may be set at zero.

Since the initial power input value of BESS 2 is less than the charging input, the energy storage farm has not yet allocated all of the power associated with the charging input. Specifically, in the illustrated example, an unallocated power value of 800 KW exists (i.e., 1.8 MW−1 MW=800 KW). As shown in FIG. 11C, to account for this unallocated power, the unallocated power value of 800 KW may be redistributed among the energy storage systems based on their remaining power capabilities. For instance, in the illustrated embodiment, since BESS 1 and BESS 3 were initially allocated 0.0 KW, the remaining power capability of BESS 1 and BESS 3 may be determined to be 1 MW (i.e., 1 MW−0.0 KW=1 MW). Additionally, since BESS 2 was initially allocated 1 MW, the remaining power capability of BESS 2 may be determined to be 0.0 KW (i.e., 1 MW−1 MW=0.0 KW).

Given the remaining power capabilities, the unallocated 800 KW may be distributed between BESS 1 and BESS 3 during the second stage of power distribution based on each energy storage system's remaining power capability as a proportion of the total remaining power capability in the energy storage farm. For instance, in the illustrated embodiment, the energy storage farm has a total remaining capability of 2 MW, with BESS 1 and BESS 3 each accounting for half of the total remaining capability. As such, BESS 1 and BESS 3 may each have a distribution value of 0.5, and BESS 2 may have a distribution value of zero.

Thereafter, an updated power input value may be determined for each energy storage system. As indicated above, the updated power input values may be calculated by adding an additional amount of power determined for each energy storage system based on its distribution value to the initial power input value determined for such energy storage system. For instance, in the illustrated embodiment, BESS 1 and BESS 3 may each be allocated an additional 400 KW of the unallocated 800 KW (i.e., 0.50×800 KW=400 KW). The updated power input values may then be determined for each energy storage system by adding the additional power allocation provided for each energy storage system with its initial power input value. As described above, each energy storage system may then receive an amount of power equal to its updated power input value to ensure that the charging input is met. For instance, in the illustrated embodiment, the sum of the updated power outputs for the energy storage systems is equal to the initial charging input (i.e., 400 KW+1 MW+400 KW=1.8 MW).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for distributing power among a plurality of energy storage systems in an energy storage farm, each energy storage system of the plurality of energy storage systems having at least one energy storage device, the method comprising:

receiving, by one or more processors, data from a countdown timer associated with each energy storage system, the data indicative of an amount of time remaining until the associated energy storage system is to be taken offline to allow a state of charge of the associated energy storage system to be increased to a top-of-charge state;

monitoring, by the one or more processors, the countdown timer for each energy storage system;

determining, by the one or more processors, whether a countdown timer value for any of the energy storage systems is less than a maintenance threshold corresponding to a first countdown timer value that is greater than a second countdown timer value at which the associated energy storage system is to be taken offline;

initially identifying, by the one or more processors, a first energy storage system of the plurality of energy storage systems as a candidate charge contributor when it is determined that the countdown timer value for the first energy storage system is less than the maintenance threshold;

determining, by the one or more processors, whether a total amount of charge contributors for the energy storage farm is less than a charge contributor threshold;

responsive to determining the total amount of charge contributors is less than the charge contributor threshold, identifying, by the one or more processors, the first energy storage system as a charge contributor;

identifying, by the one or more processors, a second energy storage system of the plurality of energy storage systems as a discharge contributor when a countdown timer value of the second energy storage system is greater than or equal to the first countdown timer value;

controlling, by the one or more processors, the operation of the energy storage farm such that power distribution in the energy storage farm is biased so as to increase the state of charge of the charge contributor prior to increasing the state of charge of the discharge contributor; and resetting, by the one or more processors, the countdown timer associated with the charge contributor when the state of charge of the charge contributor reaches the top-of-charge state, wherein resetting the countdown timer associated with the charge contributor occurs while the charge contributor is online.

2. The method of claim 1, wherein the power distribution within the energy storage farm is configured to be biased so as to drive the state of charge of the charge contributor to the top-of-charge state prior to increasing the state of charge of the discharge contributor.

3. The method of claim 1, further comprising:
receiving, by the one or more processors, a power request associated with a power output to be discharged from the energy storage farm; and
controlling, by the one or more processors, the operation of the energy storage farm such that power is discharged first from the discharge contributor in order to satisfy the power request.

4. The method of claim 3, further comprising:
determining, by the one or more processors, whether the power request exceeds a cumulative power capability of all of the discharge contributors within the energy storage farm; and
responsive to determining the power request exceeds the cumulative power capability, controlling, by the one or more processors, the operation of the energy storage farm such that power is also discharged from the charge contributor in order to satisfy the power request.

5. An energy storage farm, comprising:
a plurality of energy storage systems, each energy storage system having at least one energy storage device; and
a control system configured to perform one or more operations, the one or more operations comprising:
receiving, by one or more processors of the control system, data from a countdown timer associated with each energy storage system, the data indicative of an amount of time remaining until the associated energy storage system is to be taken offline to allow a state of charge of the associated energy storage system to be increased to a top-of-charge state;
monitoring, by the one or more processors, the countdown timer for each energy storage system;
determining, by the one or more processors, whether a countdown timer value for any of the energy storage systems is less than a maintenance threshold corresponding to a first countdown timer value that is greater than a second countdown timer value at which the associated energy storage system is to be taken offline;
initially identifying, by the one or more processors, a first energy storage system of the plurality of energy storage systems as a candidate charge contributor when it is determined that the countdown timer value for the first energy storage system is less than the maintenance threshold;
determining, by the one or more processors, whether a total amount of charge contributors for the energy storage farm is less than a charge contributor threshold;
responsive to determining the total amount of charge contributors is less than the charge contributor threshold, identifying, by the one or more processors, the first energy storage system as a charge contributor;
identifying, by the one or more processors, a second energy storage system of the plurality of energy storage systems as a discharge contributor when a countdown timer value of the second energy storage system is greater than or equal to the first countdown timer value; and
controlling, by the one or more processors, the operation of the energy storage farm such that power distribution in the energy storage farm is biased so as to increase the state of charge of the charge contributor prior to increasing the state of charge of the discharge contributor; and
resetting, by the one or more processors, the countdown timer associated with the charge contributor when the state of charge of the charge contributor reaches the top-of-charge state,
wherein resetting the countdown timer associated with the charge contributor occurs while the charge contributor is online.

6. The energy storage farm of claim 5, wherein the control system is configured to bias the power distribution in the energy storage farm so as to drive the state of charge of the at least one charge contributor to the top-of-charge state prior to increasing the state of charge of the at least one discharge contributor.

7. The energy storage farm of claim 5, wherein the one or more operations further comprise:
receiving, by the one or more processors, a power request associated with a power output to be discharged from the energy storage farm; and
controlling, by the one or more processors, the operation of the energy storage farm such that power is discharged first from the discharge contributor in order to satisfy the power request.

8. The energy storage farm of claim 7, further comprising:
determining, by the one or more processors, whether the power request exceeds a cumulative power capability of all of the discharge contributors within the energy storage farm; and
responsive to determining the power request exceeds the cumulative power capability, controlling, by the one or more processors, the operation of the energy storage farm such that power is also discharged from the at least one charge contributor in order to satisfy the power request.

9. A method for distributing power among a plurality of energy storage systems in an energy storage farm, each energy storage system of the plurality of energy storage systems having at least one energy storage device, the method comprising:
receiving, by the one or more processors, data from a countdown timer associated with each energy storage system, the data indicative of an amount of time remaining until the associated energy storage system is to be taken offline to allow a state of charge of the associated energy storage system to be increased to a top-of-charge state;
monitoring, by the one or more processors, the countdown timer for each energy storage system;
determining, by the one or more processors, whether a countdown timer value for any of the energy storage systems of the plurality of energy storage systems is less than a maintenance threshold corresponding to a first countdown timer value that is greater than a second countdown timer value at which the associated energy storage system is to be taken offline;
identifying, by the one or more processors, at least one energy storage system as a charge contributor when a countdown timer value of the at least one energy storage system is less than the first countdown timer value;
identifying, by the one or more processors, at least one energy storage system as a discharge contributor when a countdown timer value of the at least one energy storage system is greater than or equal to the first countdown timer value;
controlling, by the one or more processors, the operation of the energy storage farm such that power distribution in the energy storage farm is biased so as to increase the state of charge of the charge contributor prior to increasing the state of charge of the discharge contributor; and
resetting, by the one or more processors, the countdown timer associated with the charge contributor when the state of charge of the charge contributor reaches the top-of-charge state;
receiving, by the one or more processors, a power distribution input associated with an amount of power to be delivered from or received by the energy storage farm;
responsive to the power distribution input, determining, by the one or more processors, an initial power value for each energy storage system in the energy storage farm based at least in part on the state of charge associated with each energy storage system;
determining, by the one or more processors, an unallocated power value based at least in part on the received power distribution input and the initial power values determined for each energy storage system;
determining, by the one or more processors, an updated power value for each energy storage system based at least in part on the unallocated power value, the updated power value for at least one energy storage system within the energy storage farm corresponding to an increase in the initial power value determined for the at least one energy storage system; and
controlling, by the one or more processors, the operation of the energy storage farm such that each energy storage system delivers or receives an amount of power equal to the updated power value determined for the energy storage system.

10. The method of claim 9, wherein the power distribution input corresponds to a power request associated with discharging power from the energy storage farm, further comprising, when the sum of the updated power values for each discharge contributor is less than the power distribution input, controlling, by the one or more processors, the operation of the energy storage farm such that each discharge contributor delivers an amount of power equal to the updated power value determined for the discharge contributor and each charge contributor delivers an amount of power equal to at least a portion of the difference between the power distribution input and the sum of the updated power values for each discharge contributor.

11. The method of claim 9, wherein the power distribution input corresponds to a charging input associated with power to be received by the energy storage farm, further comprising, when the sum of the updated power value for each charge contributor is less than the power distribution input, controlling, by the one or more processors the operation of the energy storage farm such that each charge contributor receives an amount of power equal to the updated power value determined for the charge contributor and each discharge contributor receives an amount of power equal to at least a portion of the difference between the power distribution input and the-sum of the updated power values for each charge contributor.

12. The method of claim 9, wherein, during a charging event, the initial power value for each discharge contributor in the energy storage farm is equal to zero and, during a discharging event, the initial power value for each charge contributor in the energy storage farm is equal to zero.

* * * * *